(12) United States Patent
Xiu et al.

(10) Patent No.: US 12,244,804 B2
(45) Date of Patent: Mar. 4, 2025

(54) METHODS AND APPARATUS OF VIDEO CODING IN 4:4:4 CHROMA FORMAT

(71) Applicant: BEIJING DAJIA INTERNET INFORMATION TECHNOLOGY CO., LTD., Beijing (CN)

(72) Inventors: Xiaoyu Xiu, Beijing (CN); Yi-Wen Chen, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 17/857,849

(22) Filed: Jul. 5, 2022

(65) Prior Publication Data

US 2022/0345705 A1 Oct. 27, 2022

Related U.S. Application Data

(63) Continuation of application No. PCT/US2021/012165, filed on Jan. 5, 2021.
(Continued)

(51) Int. Cl.
*H04N 19/122* (2014.01)
*H04N 19/146* (2014.01)
(Continued)

(52) U.S. Cl.
CPC ......... *H04N 19/122* (2014.11); *H04N 19/146* (2014.11); *H04N 19/159* (2014.11);
(Continued)

(58) Field of Classification Search
CPC .. H04N 19/122; H04N 19/146; H04N 19/159; H04N 19/184; H04N 19/186;
(Continued)

(56) References Cited

U.S. PATENT DOCUMENTS 9,813,733 B2   11/2017 Gao et al.
2014/0376611 A1   12/2014 Kim et al.
(Continued)

FOREIGN PATENT DOCUMENTS

CN   105432077 A   3/2016
CN   108106203 A   11/2016
(Continued)

OTHER PUBLICATIONS

Hsieh et al. "Clipping for Cross Component Prediction and Adaptive Color Transform," 20. JCT-VC Meeting; Feb. 10, 2015-Feb. 18, 2015, Geneva, Joint Collaborative Team on Video Coding of ISO/IEC JTC1/SC29/WG11 and ITU-T SG.16, No. JCTVC-T0132, Feb. 17, 2015, XP030241460 (Year: 2015).*
(Continued)

*Primary Examiner* — Sath V Perungavoor
*Assistant Examiner* — Tyler B Edwards
(74) *Attorney, Agent, or Firm* — MASCHOFF BRENNAN; Younghwan Lee; Liang Huang

(57) ABSTRACT

An electronic apparatus performs a method of coding video data. The method comprises: receiving, from the bitstream, the video data corresponding to a coding unit, wherein the coding unit is coded by intra-prediction mode or inter-prediction mode; receiving a first syntax element from the video data, wherein the first syntax element indicates whether the coding unit has been coded using adaptive color-space transform (ACT); processing the video data to generate residuals of the coding unit; in accordance with a determination based on the first syntax element that the
(Continued)

coding unit has been coded using the ACT, performing a clipping operation that confines a dynamic range of the residuals of the coding unit within a predefined range; and applying an inverse ACT to the residuals of the coding unit after the clipping operation.

19 Claims, 17 Drawing Sheets

Related U.S. Application Data

(60) Provisional application No. 62/965,859, filed on Jan. 25, 2020, provisional application No. 62/957,273, filed on Jan. 5, 2020.

(51) Int. Cl.
*H04N 19/156* (2014.01)
*H04N 19/159* (2014.01)
*H04N 19/184* (2014.01)
*H04N 19/186* (2014.01)
*H04N 19/61* (2014.01)
*H04N 19/70* (2014.01)

(52) U.S. Cl.
CPC ......... *H04N 19/184* (2014.11); *H04N 19/186* (2014.11); *H04N 19/619* (2014.11); *H04N 19/70* (2014.11)

(58) Field of Classification Search
CPC ...... H04N 19/619; H04N 19/70; H04N 19/96; H04N 19/157; H04N 19/182; H04N 19/117; H04N 19/423; H04N 19/82; H04N 19/60
See application file for complete search history.

(56) References Cited

U.S. PATENT DOCUMENTS

| | | |
|---|---|---|
| 2015/0264402 A1 | 9/2015 | Zhang et al. |
| 2015/0373327 A1 | 12/2015 | Zhang et al. |
| 2016/0100175 A1 | 4/2016 | Laroche et al. |
| 2016/0227224 A1* | 8/2016 | Hsieh ............... H04N 19/96 |
| 2017/0230676 A1 | 8/2017 | Filipovic |
| 2017/0244980 A1 | 8/2017 | Monnier |
| 2017/0318301 A1 | 11/2017 | Li |
| 2017/0374378 A1 | 12/2017 | Jeong et al. |

FOREIGN PATENT DOCUMENTS

| | | |
|---|---|---|
| CN | 107079157 A | 8/2017 |
| CN | 109417639 A | 3/2019 |
| EP | 3297282 A1 | 3/2018 |
| JP | 2017005688 A | 1/2017 |
| JP | 2018507622 A | 3/2018 |
| KR | 1020160132869 A | 11/2016 |
| KR | 1020160132990 A | 11/2016 |
| KR | 1020170013274 A | 2/2017 |
| KR | 1020170108964 A | 9/2017 |
| WO | 2016040865 A1 | 3/2016 |
| WO | 2016123232 A1 | 8/2016 |

OTHER PUBLICATIONS

Zhang et al. "SCCE5 Test 3.2.1: In-Loop Color Space Transform," 18. JCT-VC Meeting; Jun. 30, 2014-Jul. 9, 2014; Sapporo; Joint Collaborative Team on Video Coding of ISO/IEC JTC1/SC29/WG11 and ITU-T SG.16, No. JCTVC-R0147, Jul. 2, 2014, XP030240298 (Year: 2014).*
Ted Hsieh et al., Qualcomm Incorporated, "Clipping for Cross Component Prediction and Adaptive Colour Transform", Document: JCTVC-T0132, Joint Collaborative Team on Video Coding (JCT-VC) of ITU-T SG 16 WP 3 and ISO/IEC JTC 1/SC 29/WG 11. 20th Meeting: Geneva, Switzerland, Feb. 10-Feb. 18, 2013, 7 pgs.
Rajan Joshi et al., "High Efficiency Video Coding (HEVC) Screen Content Coding Draft 6", Document: JCTVC-W1005-v4, Joint Collaborative Team on Video Coding (JCT-VC) of ITU-T SC 16 WP 3 and ISO/IEC JTC 1/SC 29/WG 11, 23rd Meeting: San Diego, USA, Feb. 19-26, 2016, 9 pgs.
Zhang et al., Bytedance, Ericsson, InterDigital, KDDI, Kwai, LGE, Qualc.omm, Sony, WILUS, "ACT common text for bug fixes", Document: JVET-Q0820, Joint Video Experts Team (JVET) of ITU-T SC 16 WP 3 and ISO/IEC JTC 1/SC 29/NVG 11, 17th Meeting: Brussels, BE, Jan. 7-17, 2020, 10 pgs.
FastVDO LLC, "Adaptive Colour Transforms for Screen Content Coding", Document: JCTVC-S0133r1, Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, 11 pgs.
Qualcomm Inc., InterDigital Communications, LLC, et al., "SCCE5 Test 3.2.1: In-loop color-space transform", Document: JCTVC-R0147 proposed text, Joint Collaborative Team on Video Coding (JCT-VC) of ITU-T SG 16 WP 3 and ISO/IEC JTC 1/SC 29/WG 11 18th Meeting: Sapporo, JP, Jun. 30-Jul. 9, 2014, 13 pgs.
Flynn et al., "High Efficiency Video Coding (HEVC) Range Extensions text specification: Draft 7", Document: JCTVC-Q1005_v9, Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014, 350 pgs.
Technicolor, "Adaptive Clipping in JEM2.0", Document: JVET-00040-r3, Joint Video Exploration Team (JVET) of ITU-T SG 16 WP 3 and ISO/IEC JTC 1/SC 29/VVG 11, 3rd Meeting: Geneva, CH, May 26-Jun. 1, 2016, 7 pgs.
Beijing Dajia Internet Information Technology Co. Ltd., International Search report and Written Opinion, PCT/US2021/012165, Apr. 19, 2021, 8pgs.
Indian Provisional Application No. IN201747021775A, 62 pages.
Xin et al.; "Support of adaptive color transform for 444 video coding in VVC", Joint Video Experts Team (JVET) of ITU-T SG 16 WP 3 and ISO/IEC JTC1/SC29/WG 11, Document: JVET-P0517, 16th Meeting: Geneva, CH, Oct. 1-11, 2019, 7 pgs.
Proposed spec changes, 7.2.3.2 Sequence parameter set RBSP syntax, 8 pgs.

* cited by examiner $$\begin{pmatrix} Y \\ Cg \\ Co \end{pmatrix} = \begin{pmatrix} 2 & 1 & 1 \\ 2 & -1 & -1 \\ 0 & -2 & 2 \end{pmatrix} \begin{pmatrix} G \\ B \\ R \end{pmatrix} / 4$$

$$\begin{pmatrix} G \\ B \\ R \end{pmatrix} = \begin{pmatrix} 1 & 1 & 0 \\ 1 & -1 & -1 \\ 1 & -1 & 1 \end{pmatrix} \begin{pmatrix} Y \\ Cg \\ Co \end{pmatrix}$$

FIG. 5A

METHODS AND APPARATUS OF VIDEO CODING IN 4:4:4 CHROMA FORMAT

CROSS-REFERENCE TO RELATED APPLICATIONS

The present application is a continuation of International Application No. PCT/US2021/012165, entitled "METHODS AND APPARATUS OF VIDEO CODING IN 4:4:4 CHROMA FORMAT", filed on Jan. 5, 2021, which claims priority to U.S. Provisional Patent Application No. 62/957,273, entitled "METHODS AND APPARATUS ON 4:4:4 VIDEO CODING" filed on Jan. 5, 2020, and U.S. Provisional Patent Application No. 62/965,859, entitled "METHODS AND APPARATUS ON 4:4:4 VIDEO CODING" filed on Jan. 25, 2020, all of which are incorporated by reference in their entirety.

TECHNICAL FIELD

The present application generally relates to video data coding and compression, and in particular, to method and system of performing a clipping operation before an adaptive color-space transform (ACT).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or Intra block copy (IBC) modes. Video blocks in an intra coded (I) slice of a video frame are encoded using spatial prediction with respect to reference samples in neighboring blocks within the same video frame. Video blocks in an inter coded (P (the forward Predicted pictures) or B (bidirectionally predicted pictures)) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

Certain video content, e.g., screen content videos, is encoded in 4:4:4 chroma format in which all three components (the luma component and both chroma components) have the same resolution. Although 4:4:4 chroma format includes more redundancies compared to that in 4:2:0 chroma format and 4:2:2 chroma format (which is unfriendly to achieving a good compression efficiency), 4:4:4 chroma format is still the preferred encoding format for many applications where high fidelity is required to preserve color information, such as sharp edges, in the decoded video. Given the redundancies that exist in 4:4:4 chroma format video, there are evidences that significant coding improvement can be achieved by exploiting the correlations among the three color components of 4:4:4 video (e.g. Y, Cb and Cr in YCbCr domain; or G, B and R in RGB domain). Due to these correlations, during the development of HEVC screen content coding (SCC) extension, the adaptive color-space transform (ACT) tool is employed to exploit the correlation among three color components.

SUMMARY

The present application describes implementations related to video data encoding and decoding and, more particularly, to method and system of performing a clipping operation before an adaptive color-space transform (ACT).

For video signal which is originally captured in 4:4:4 color format, it is preferable to encode the video in original space if high fidelity is desired for the decoded video signal and there is abundant information redundancy in the original color space, e.g., RGB videos. Although some inter-component coding tools in the current VVC standard, e.g., cross-component linear model prediction (CCLM), could improve the efficiency of 4:4:4 video coding, the redundancy between the three components are not fully removed. This is because only Y/G component is utilized to predict Cb/B and Cr/R components while the correlation between Cb/B and Cr/R components is not considered. Correspondingly, further de-correlation of three color components may improve coding performance for 4:4:4 video coding.

In the current VVC standard, the designs of the existing inter and intra tools are mainly focused on videos that are captured in 4:2:0 chroma format. Therefore, in order to achieve a better complexity/performance trade-off, most of those coding tools are only applicable to the luma component but disabled for the chroma components (e.g., position-dependent intra prediction combination (PDPC), multi-reference line (MRL), and sub-partition prediction (ISP)), or use different operations to luma and chroma components (e.g., the interpolation filters that are applied to motion compensated prediction). However, compared to 4:2:0 videos, video signal in 4:4:4 chroma format represents very different characteristics. For example, Cb/B and Cr/R components of 4:4:4 YCbCr and RGB videos represent more abundant color information and possess more high-frequency information (e.g., edges and textures) than the chroma components in 4:2:0 videos. With such consideration, it may be always optimal to use the same design of some existing coding tools in the VVC for both 4:2:0 and 4:4:4 videos.

According to a first aspect of the present application, a method of decoding video data includes: receiving, from the bitstream, the video data corresponding to a coding unit, wherein the coding unit is coded by intra-prediction mode or inter-prediction mode; receiving a first syntax element from the video data, wherein the first syntax element indicates whether the coding unit has been coded using adaptive color-space transform (ACT); processing the video data to generate residuals of the coding unit; in accordance with a determination based on the first syntax element that the coding unit has been coded using the ACT, performing a clipping operation to the residuals of the coding unit; and applying an inverse ACT to the residuals of the coding unit after the clipping operation.

In some embodiments, the clipping operation confines a dynamic range of the residuals of the coding unit within a predefined range for processing by the inverse ACT.

According to a second aspect of the present application, an electronic apparatus includes one or more processing units, memory and a plurality of programs stored in the memory. The programs, when executed by the one or more processing units, cause the electronic apparatus to perform the methods of decoding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the methods of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIGS. 5A and 5B are block diagrams illustrating examples of applying the technique of adaptive color-space transform (ACT) to transform residuals between RGB color space and YCgCo color space in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

In some embodiments, the methods are provided to improve the coding efficiency of the VVC standard for 4:4:4 videos. In general, the main features of the technologies in this disclosure are summarized as follow.

In some embodiments, the methods are implemented to improve the existing ACT design that enables adaptive color space conversion in the residual domain. Particularly, special considerations are made to handle the interaction of the ACT with some existing coding tools in the VVC.

In some embodiments, the methods are implemented to improve the efficiency of some existing inter and intra coding tools in the VVC standard for 4:4:4 videos, including: 1) enabling 8-tap interpolation filters for the chroma components; 2) enabling the PDPC for the intra prediction of the chroma components; 3) enabling the MRL for the intra prediction of the chroma components; 4) enabling the ISP partitioning for the chroma components.

Figure 1:
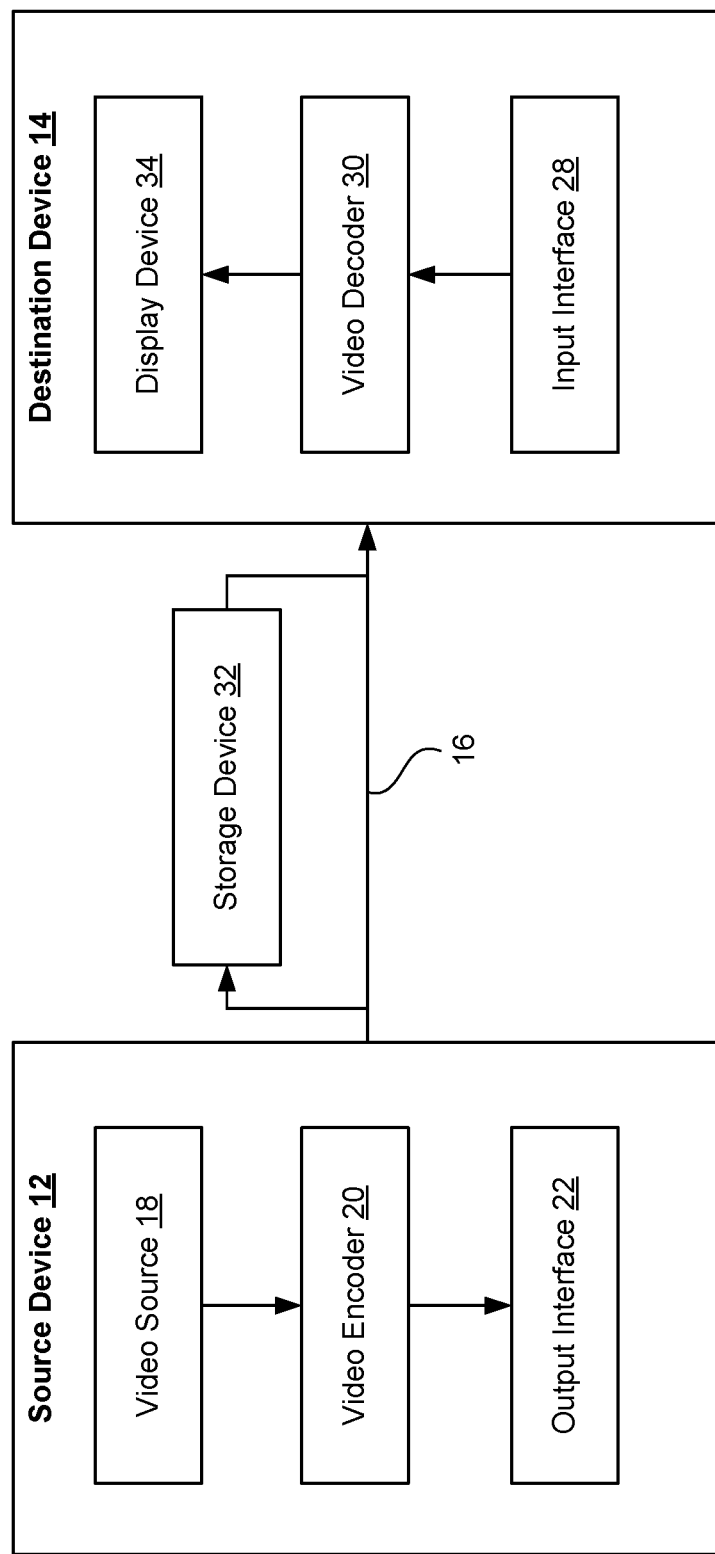
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
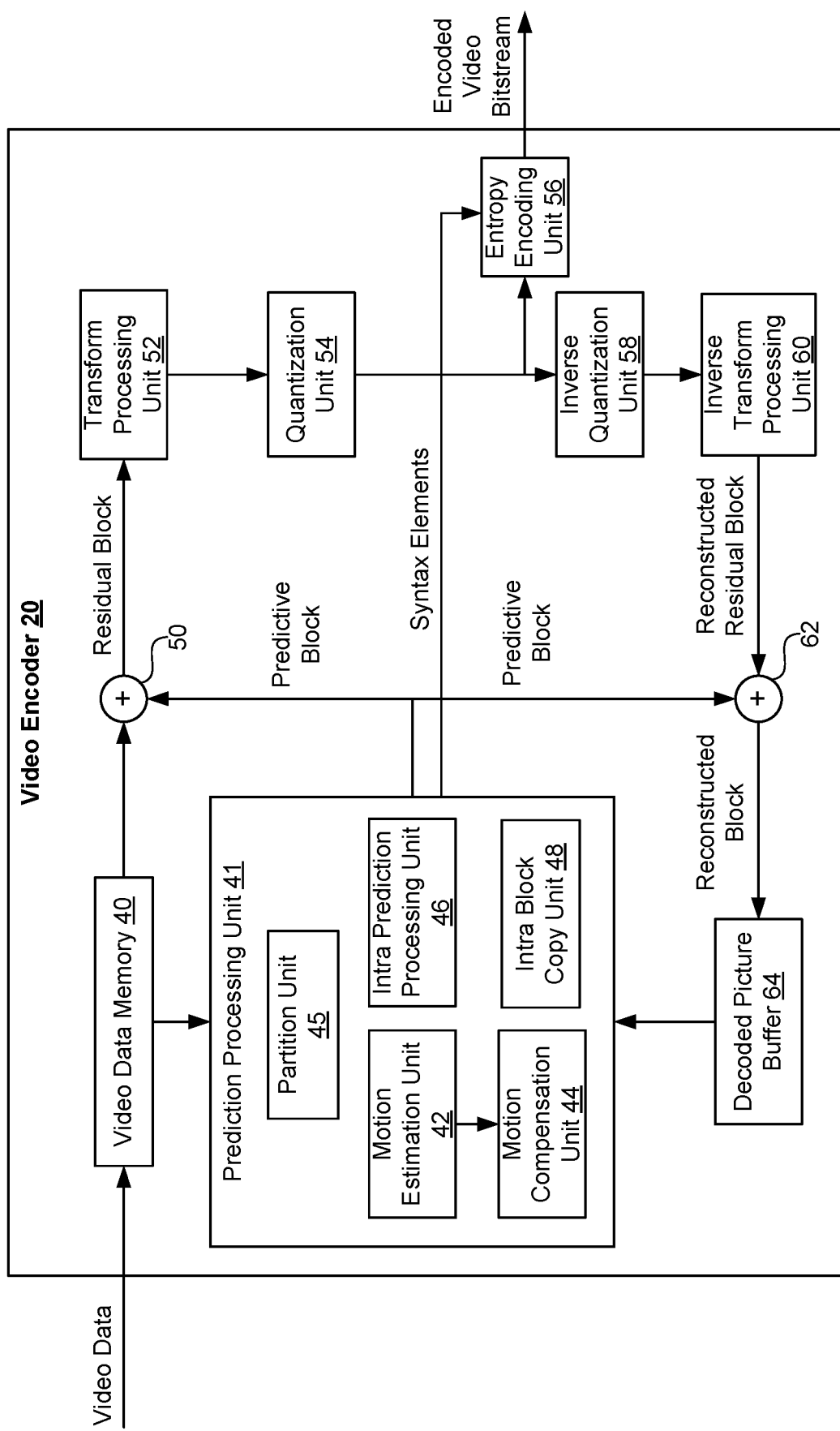
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to describe the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
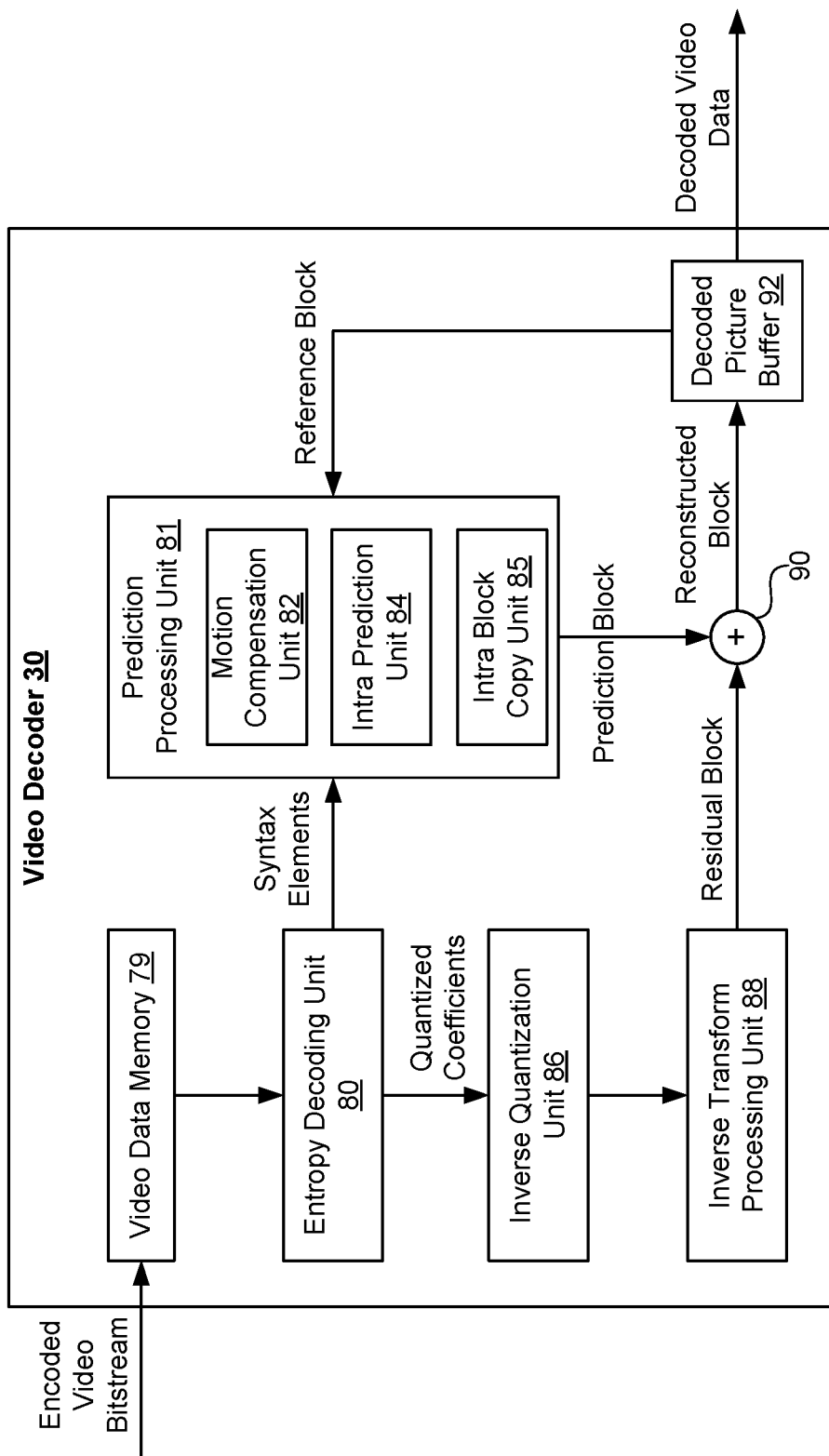
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
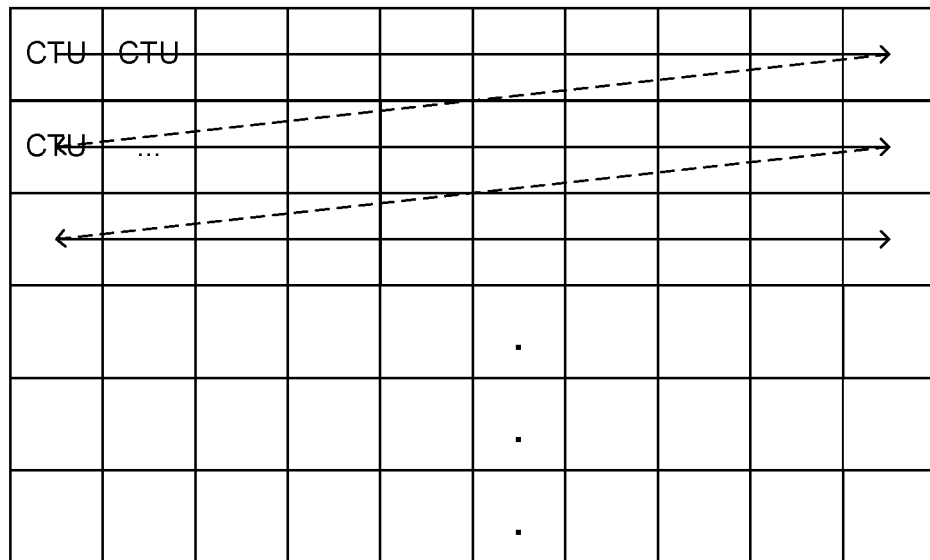
FIGS. 4A through 4E are block diagrams illustrating how a frame is recursively partitioned into multiple video blocks of different sizes and shapes in accordance with some implementations of the present disclosure.
Figure 4B:
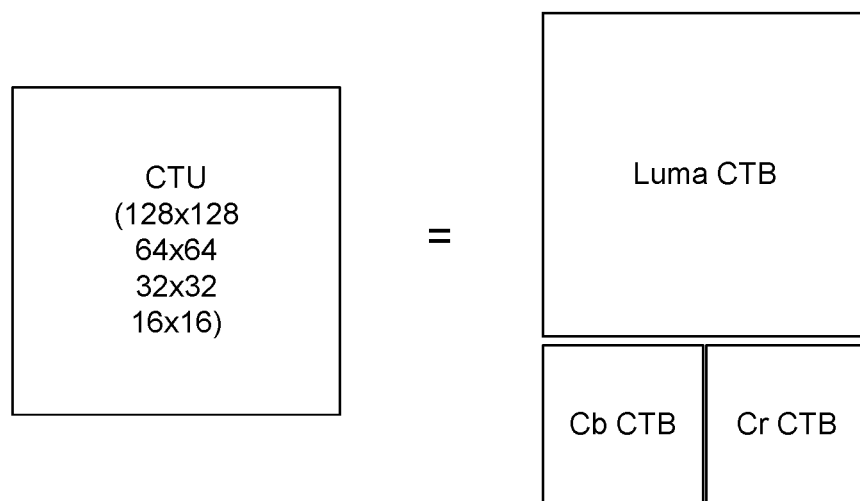

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
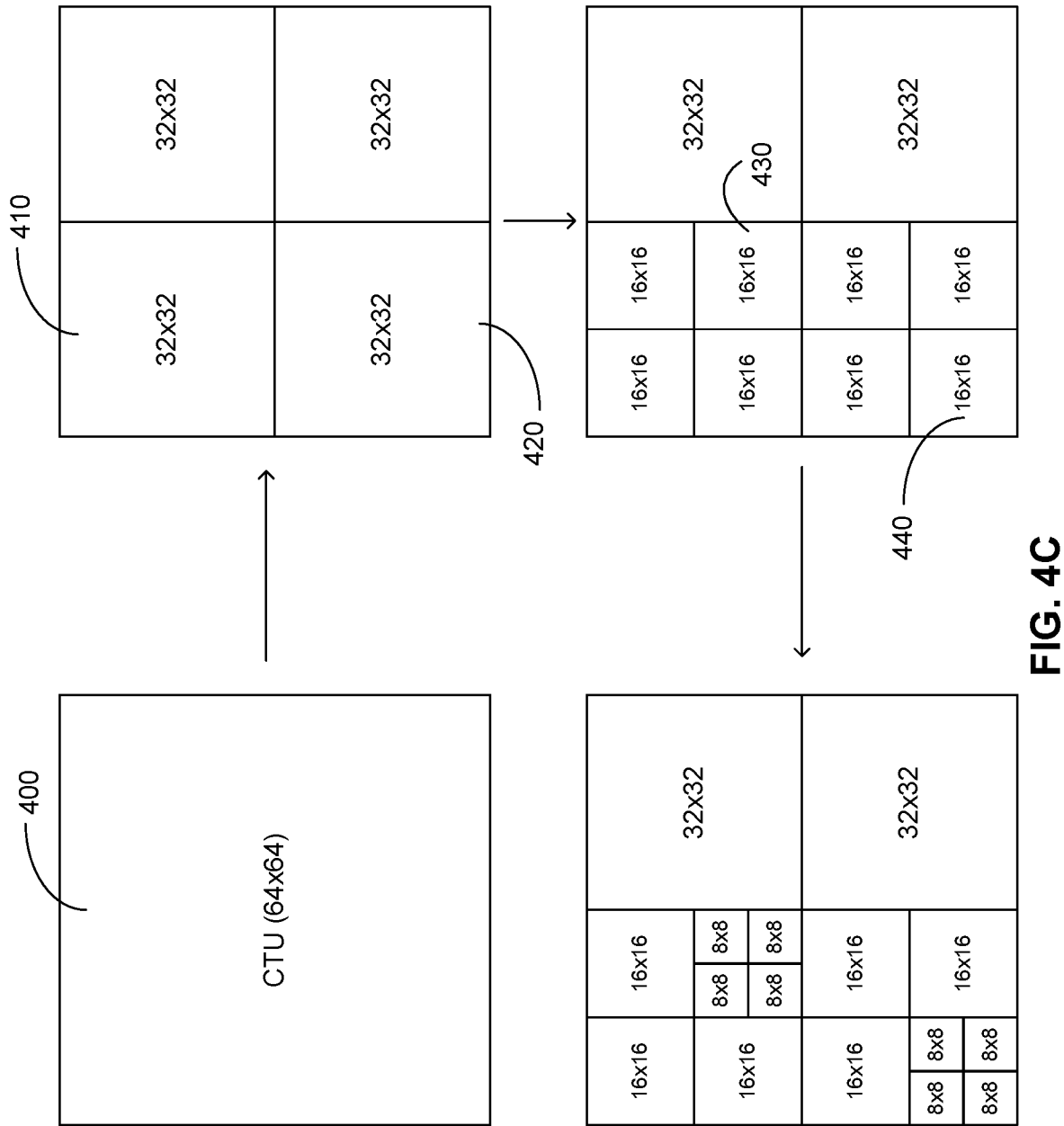
Figure 4D:
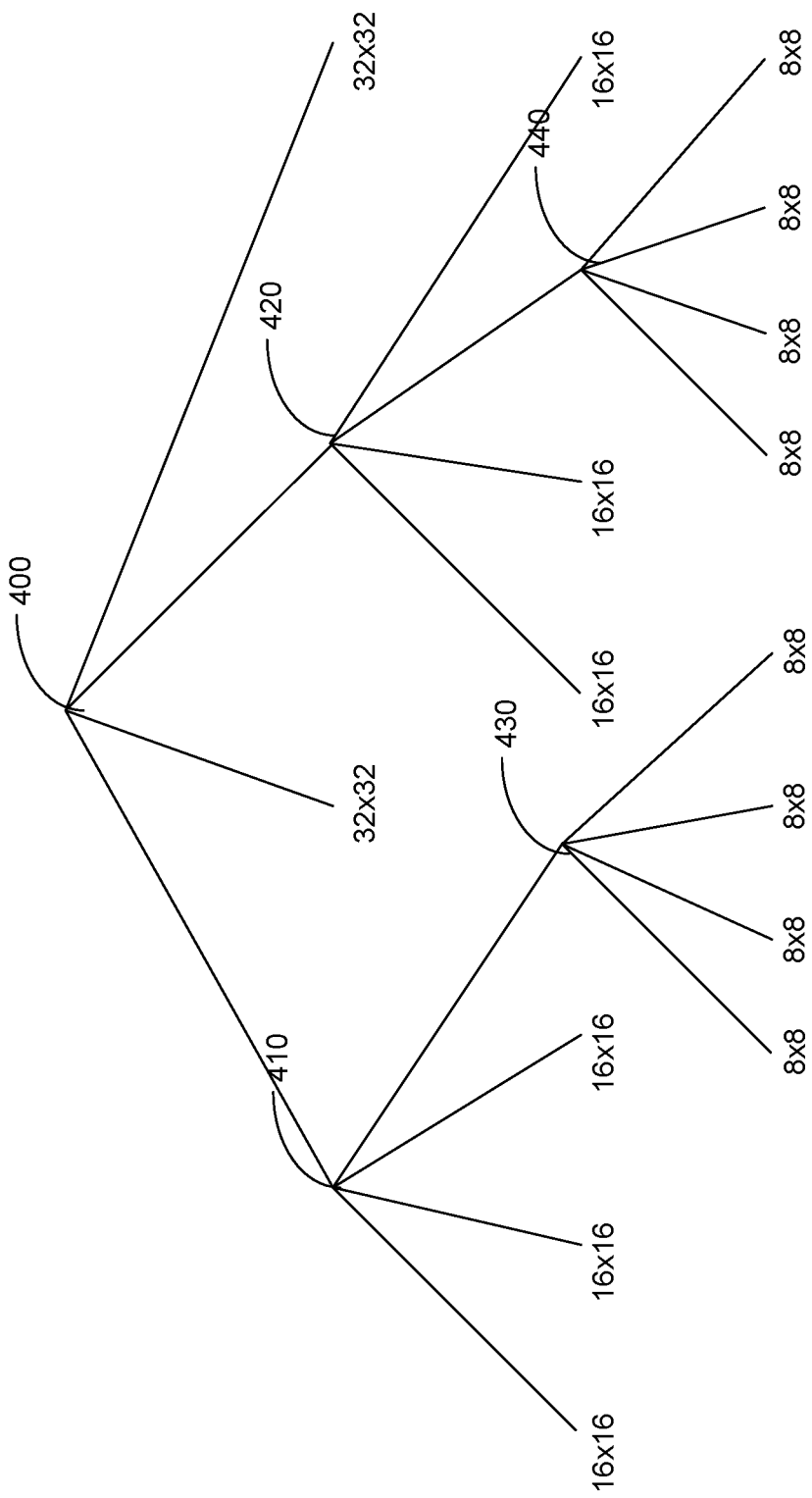
Figure 4E:
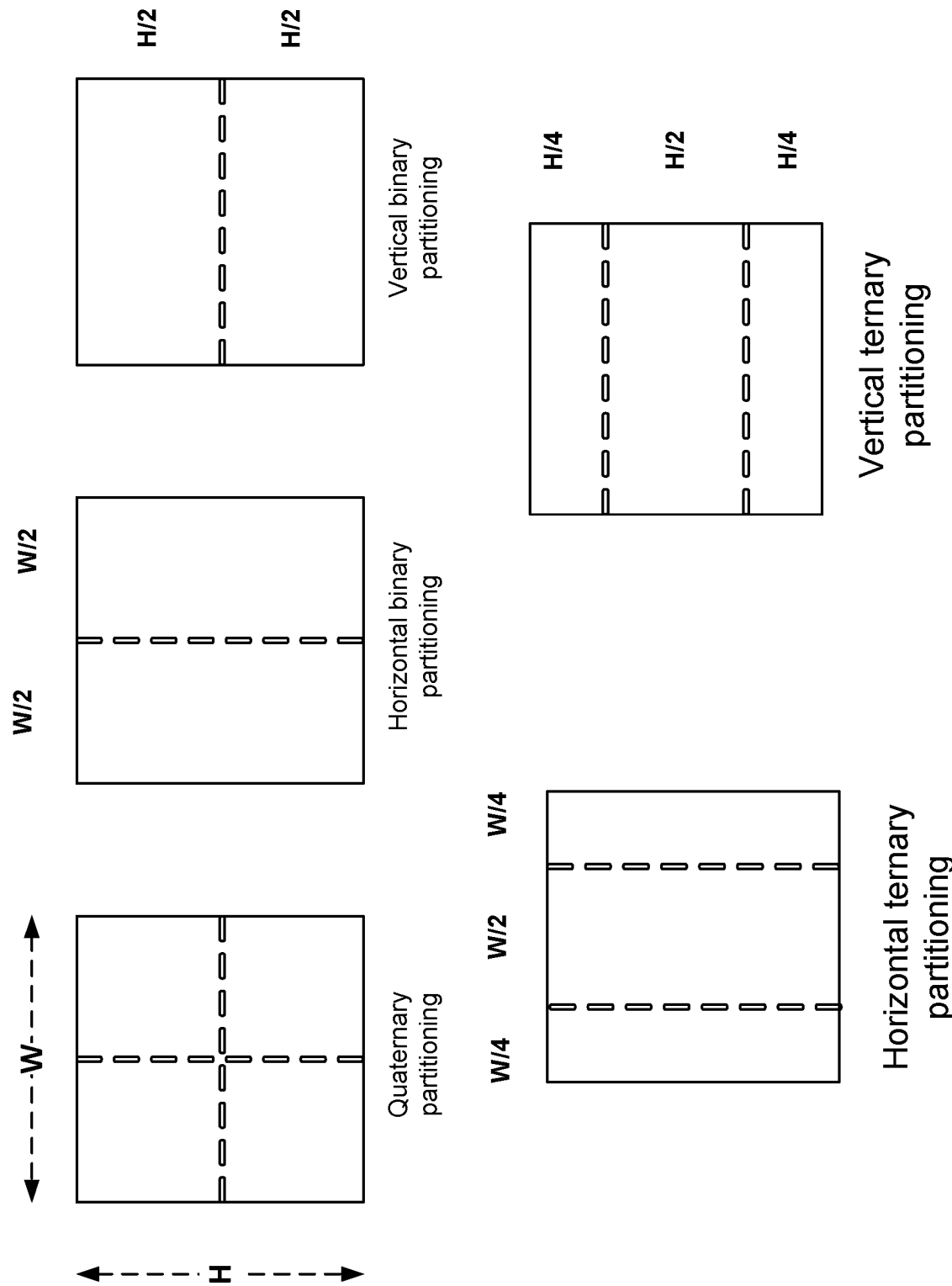

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5B:
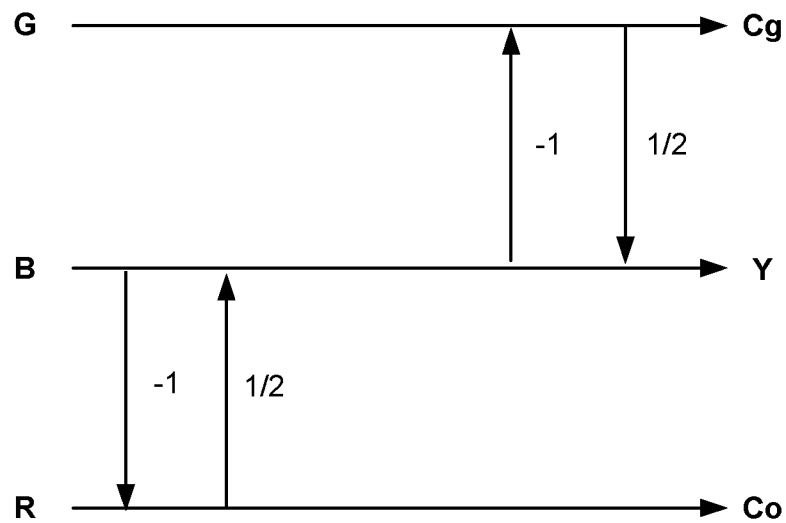
Figure 5B:
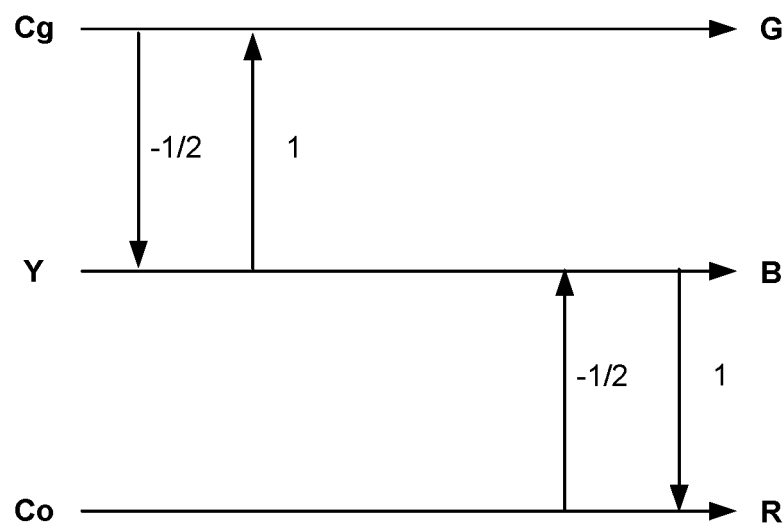

FIGS. 5A through 5B are block diagrams illustrating examples of applying the technique of adaptive color-space transform (ACT) to transform residuals between RGB color space and YCgCo color space in accordance with some implementations of the present disclosure.

In the HEVC screen content coding extension, ACT is applied to adaptively transform residuals from one color space (e.g., RGB) into another color space (e.g., YCgCo) such that the correlation (e.g., redundancy) between three color components (e.g., R, G, and B) are significantly reduced in the YCgCo color space. Further, in the existing ACT design, the adaptation of different color spaces is carried out at transform unit (TU) level by signaling one flag tu_act_enabled_flag for each TU. When the flag tu_act_enabled_flag is equal to one, it indicates that the residuals of the current TU is coded in the YCgCo space; otherwise (i.e., the flag is equal to 0), it indicates that the residuals of the current TU is coded in the original color space (i.e., without color space conversion). Additionally, depending on whether the current TU is coded in lossless mode or in lossy mode, different color space transform formulas are applied. Specifically, the forward and the inverse color space transform formulas between the RGB color space and the YCgCo color space for lossy modes are defined in FIG. 5A.

For lossless mode, the reversible version of RGB-YCgCo transform (also known as YCgCo-LS) is used. The reversible version of RGB-YCgCo transform is implemented based on lifting operations depicted in FIG. 5B and the related description.

As shown in FIG. 5A, the forward and inverse color transform matrices used in lossy mode are not normalized. Therefore, the magnitude of the YCgCo signal is smaller than that of the original signal after the color transform is applied. In order to compensate the decrease in magnitude caused by the forward color transform, an adjusted quantization parameter is applied to the residuals in the YCgCo domain. Specifically, when the color space transform is applied, the QP values $QP_Y$, $QP_{Cg}$ and $QP_{Co}$, which are used to quantize the YCgCo domain residuals, are set to be QP−5, QP−5 and QP−3 respectively, where QP is the quantization parameter used in the original color space.

Figure 6:
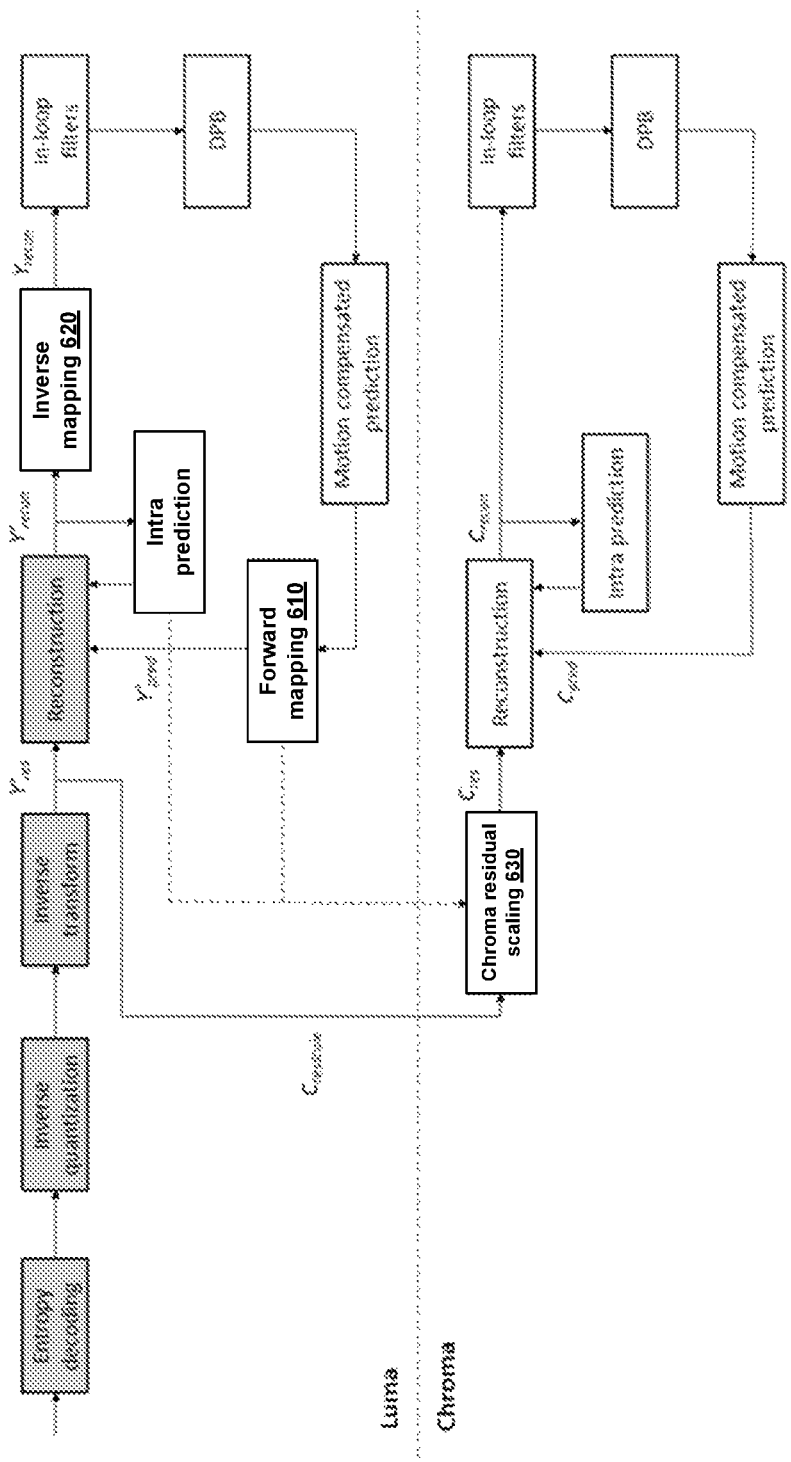
FIG. 6 is a block diagram of applying the technique of luma mapping with chroma scaling (LMCS) in an exemplary video data decoding process in accordance with some implementations of the present disclosure.

FIG. 6 is a block diagram of applying the technique of luma mapping with chroma scaling (LMCS) in an exemplary video data decoding process in accordance with some implementations of the present disclosure.

In the VVC, LMCS is used as a new coding tool applied before the in-loop filters (e.g., the de-blocking filter, the SAO and the ALF). In general, LMCS has two main modules: 1) in-loop mapping of the luma component based on adaptive piecewise linear models; 2) luma-dependent chroma residual scaling. FIG. 6 shows a modified decoding process with LMCS being applied. In FIG. 6, decoding modules that are conducted in the mapped domain include the entropy decoding module, the inverse quantization module, the inverse transform module, the luma intra prediction module, and the luma sample reconstruction module (i.e., the addition of the luma prediction samples and the luma residual samples). The decoding modules that are conducted in the original (i.e., non-mapped) domain include the motion compensated prediction module, the chroma intra prediction module, the chroma sample reconstruction module (i.e., the addition of the chroma prediction samples and the chroma residual samples), and all the in-loop filter modules such as the deblocking module, the SAO module, and the ALF module. The new operational modules introduced by LMCS include the forward mapping module 610 of luma samples, the inverse mapping module 620 of luma samples, and the chroma residual scaling module 630.

The in-loop mapping of LMCS can adjust the dynamic range of the input signal to improve the coding efficiency. The in-loop mapping of the luma samples in the existing LMCS design is built upon two mapping functions: one forward mapping function FwdMap and one corresponding inverse mapping function InvMap. The forward mapping function is signaled from encoder to decoder using one piecewise linear model with sixteen equal-size pieces. The inverse mapping function can be directly derived from the forward mapping function and therefore does not need to be signaled.

The parameters of luma mapping model are signaled at slice level. A presence flag is firstly signaled to indicate if luma mapping model is to be signaled for a current slice. If luma mapping model is present in the current slice, the corresponding piecewise linear model parameters are further signaled. Additionally, at slice level, another LMCS control flag is signaled to enable/disable LMCS for the slice.

Chroma residual scaling module 630 is designed to compensate for the interaction of quantization precision between the luma signal and its corresponding chroma signals when the in-loop mapping is applied to the luma signal. It is also signaled in the slice header whether chroma residual scaling is enabled or disabled for the current slice. If luma mapping is enabled, an additional flag is signaled to indicate if luma-dependent chroma residual scaling is applied or not. When luma mapping is not used, luma-dependent chroma residual scaling is always disabled and no additional flag is required. Additionally, the chroma residual scaling is always disabled for the CUs that contain less than or equal to four chroma samples.

Figure 7:
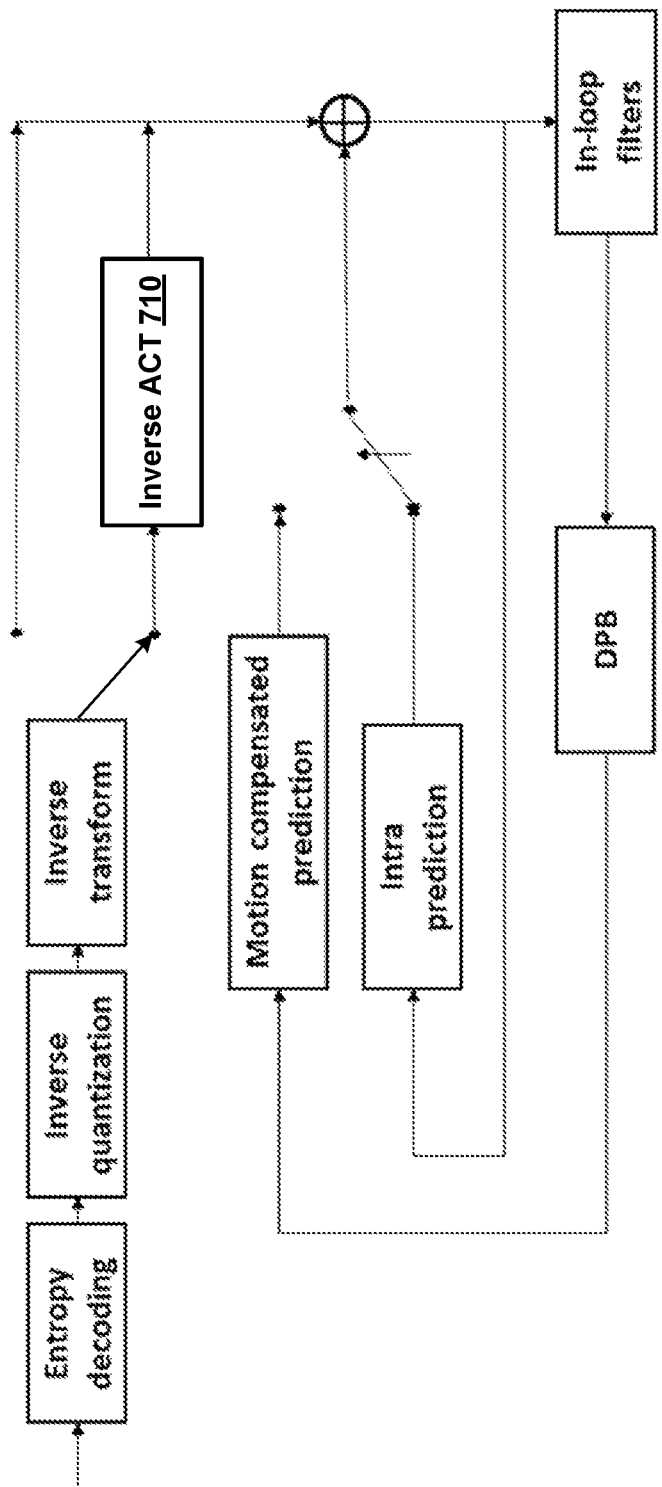
FIG. 7 is a block diagram illustrating an exemplary video decoding process by which a video decoder implements the technique of inverse adaptive color-space transform (ACT) in accordance with some implementations of the present disclosure.

FIG. 7 is a block diagram illustrating an exemplary video decoding process by which a video decoder implements the technique of inverse adaptive color-space transform (ACT) in accordance with some implementations of the present disclosure.

Similar to ACT design in the HEVC SCC, ACT in VVC converts the intra/inter prediction residuals of one CU in 4:4:4 chroma format from an original color space (e.g., RGB color space) into YCgCo color space. As a result, the redundancy between three color components can be reduced for better coding efficiency. FIG. 7 depicts the decoding flowchart in which how the inverse ACT is applied in the VVC framework through the addition of the inverse ACT module 710. When processing a CU encoded with ACT being enabled, the entropy decoding, the inverse quantization and the inverse DCT/DST-based transform first apply to the CU. After that, as depicted in FIG. 7, the inverse ACT is invoked to convert the decoded residuals from YCgCo color space to the original color space (e.g., RGB and YCbCr). Additionally, because ACT in lossy mode are not normalized, the QP adjustments of (−5, −5, −3) are applied to Y, Cg and Co components to compensate the changed magnitude of transformed residuals.

In some embodiments, ACT method reuses the same ACT core transforms of the HEVC to do the color conversion between different color spaces. Specifically, two different versions of color transforms are applied depending on whether a current CU is coded in lossy or lossless manner. The forward and inverse color transforms for lossy case use the irreversible YCgCo transform matrix as depicted in FIG. 5A. For the lossless case, the reversible color transform YCgCo-LS as shown in FIG. 5B is applied. Moreover, different from the existing ACT design, the following changes are introduced to the ACT scheme to handle its interaction with the other coding tools in the VVC standard.

For example, because the residuals of one CU in the HEVC may be partitioned into multiple TUs, ACT control flag is separately signaled for each TU to indicate whether the color space conversion needs to be applied or not. However, as described above in connection with FIG. 4E, one quadtree nested with binary and ternary partition structure is applied in the VVC to replace the multiple partition type concept, thus removing the separate CU, PU and TU partitions in the HEVC. This means that in most cases one CU leaf node is also used as the unit of prediction and transform processing without further partition, unless the maximum supported transform size is smaller than the width or height of one component of the CU. Based on such partition structure, the ACT at CU level is enabled and disabled adaptively. Specifically, one flag cu_act_enabled_flag is signaled for each CU to select between the original color space and the YCgCo color space for coding the residuals of the CU. If the flag is equal to 1, it indicates that the residuals of all the TUs within the CU are coded in the YCgCo color space. Otherwise, if the flag cu_act_enabled_flag is equal to 0, all the residuals of the CU are coded in the original color space.

In some embodiments, there are different scenarios of disabling the ACT. When the ACT is enabled for one CU, it needs to access the residuals of all three components to do the color space conversion. However, the VVC design cannot guarantee that each CU always contain the information of three components. According to the embodiment of the disclosure, in those cases where a CU does not contain the information of all three components, the ACT should be forcibly disabled.

Firstly, in some embodiments, when separate-tree partition structure is applied, the luma and chroma samples inside one CTU are partitioned into CUs based on separate partition structures. As a result, the CUs in the luma partition tree only contain the coding information of luma component and the CUs in the chroma partition tree only contain the coding information of two chroma components. According to the current VVC, the switch between single-tree and separate-tree partition structures is carried out at slice-level. Therefore, according to the embodiment of the disclosure, when it is found that the separate-tree is applied to one slice, the ACT will be always disabled for all the CUs inside the slice (both the luma CUs and chroma CUs) without signaling the ACT flag which is inferred to be zero instead.

Secondly, in some embodiments, when the ISP mode (further described below) is enabled, the TU partition is only applied to the luma samples while the chroma samples are coded without further splitting into multiple TUs. Assuming N is number of ISP sub-partitions (i.e., TUs) for one intra CU, according to the current ISP design, only the last TU contains both luma and chroma components while the first N−1 ISP TUs are composed of only luma component. According to an embodiment of the disclosure, ACT is disabled under ISP mode. There are two ways to disable the ACT for the ISP mode. In the first method, the ACT enabling/disabling flag (i.e. cu_act_enabled_flag) is signaled before signaling the syntax of ISP mode. In such case, when the flag cu_act_enabled_flag is equal to one, the ISP mode will not be signaled in bitstream but always inferred to be zero (i.e. switched off). In the second method, the ISP mode signaling is used to bypass the signaling of the ACT flag. Specifically, in this method, the ISP mode is signaled prior to the flag cu_act_enabled_flag. When the ISP mode is selected, the flag cu_act_enabled_flag is not signaled and inferred to be zero. Otherwise (the ISP mode is not selected), the flag cu_act_enabled_flag will be still signaled to adaptively select the color space for the residual coding of the CU.

In some embodiments, in addition to forcibly disable the ACT for the CUs where luma and chroma partition structure are misaligned, the LMCS is disabled for the CUs where the ACT is applied. In one embodiment, both the luma mapping and chroma residual scaling are disabled when one CU select YCgCo color space to code its residuals (i.e., the ACT is one). In another embodiment, when the ACT is enabled for one CU, only chroma residual scaling is disabled while the luma mapping can still be applied to adjust the dynamic range of the output luma samples. In the last embodiment, both the luma mapping and chroma residual scaling are enabled for the CUs which applies the ACT for coding its residuals. There may be multiple ways to enable the chroma residual scaling for CUs which apply the ACT. In one method, the chroma residual scaling is applied before the inverse ACT at decoding. By this method, it means that when the ACT is applied the chroma residual scaling is applied to the chroma residuals in the YCgCo domain (i.e., Cg and Co residuals). In another method, the chroma residual scaling is applied after the inverse ACT. Specifically, by the second method, the chroma scaling is applied to the residuals in the original color spaces. Assuming input video is captured in RGB format, it means that the chroma residual scaling is applied to the residuals of B and R components.

In some embodiments, a syntax element, e.g., sps_act_enabled_flag, is added to the sequence parameter set (SPS) to indicate if ACT is enabled or not at the sequence level. In addition, as the color-space conversion is applied to video content whose luma and chroma components have the same resolution (e.g., 4:4:4 chroma format 4:4:4), one bitstream conformance requirement needs to be added such that ACT can be enabled only for 4:4:4 chroma format. Table 1 illustrates the modified SPS syntax table with the above syntax added.

TABLE 1

Modified SPS syntax table

| | Descriptor |
|---|---|
| seq_parameter_set_rbsp( ) { | |
| ... | |
| sps_act_enabled_flag | u(1) |
| ... | |
| } | |

Specifically, sps_act_enabled_flag equal to 1 indicates ACT is enabled and sps_act_enabled_flag equal to 0 indicates that ACT is disabled such that the flag cu_act_enabled_flag is not signaled for the CUs that refers to the SPS but inferred to be 0. When ChromaArrayType is not equal to 3, it is a requirement of the bitstream conformance that the value of sps_act_enabled_flag shall be equal to 0.

In another embodiment, instead of always signaling sps_act_enabed_flag, the signaling of the flag is conditioned on the chroma type of the input signal. Specifically, given that ACT can only be applied when luma and chroma components are in the same resolution, the flag sps_act_enabled_flag is only signaled when the input video is captured in the 4:4:4 chroma format. With such change, the modified SPS syntax table is:

TABLE 2

Modified SPS syntax table with Signaling Condition

| | Descriptor |
|---|---|
| seq_parameter_set_rbsp( ) { | |
| ... | |
| if(chroma_format_idc == 3) | |
| sps_act_enabled_flag | u(1) |
| ... | |
| } | |

In some embodiments, the syntax design specification for decoding video data using ACT is illustrated in the following table.

TABLE 3

Specification for Signaling ACT Mode

| | Descriptor |
|---|---|
| coding_unit( x0, y0, cbWidth, cbHeight, cqtDepth, treeType, modeType ) { | |
| chType = treeType == DUAL_TREE_CHROMA? 1 : 0 | |
| if( slice_type != I  ‖  sps_ibc_enabled_flag  ‖ sps_palette_enabled_flag) { | |
| if( treeType != DUAL_TREE_CHROMA  && | |
| !( ( cbWidth == 4 && cbHeight == 4 )  ‖  modeType == MODE_TYPE_INTRA ) | |
| &&  !sps_ibc_enabled_flag ) ) | |
| cu_skip_flag[ x0 ][ y0 ] | ae(v) |
| if( cu_skip_flag[ x0 ][ y0 ] == 0  &&  slice_type != I | |
| &&  !( cbWidth == 4 && cbHeight == 4 )  && | |
| modeType == MODE_TYPE_ALL ) | |
| pred_mode_flag | ae(v) |
| if( ( ( slice_type == I && cu_skip_flag[ x0 ][ y0 ] ==0 )  ‖ ( slice_type != I  && | |
| CuPredMode[ chType ][ x0 ][ y0 ] != MODE_INTRA  ‖ | |
| ( cbWidth == 4  &&  cbHeight == 4  && | |

TABLE 3-continued

Specification for Signaling ACT Mode

| | Descriptor |
|---|---|
| cu_skip_flag[ x0 ][ y0 ] == 0 ) ) ) && | |
| cbWidth <= 64  &&  cbHeight <=64  &&  modeType != MODE_TYPE_INTER  && | |
| sps_ibc_enabled_flag  &&  treeType != DUAL_TREE_CHROMA ) | |
| pred_mode_ibc_flag | ae(v) |
| if( ( ( ( slicetype == I ‖ ( cbWidth == 4 && cbHeight == 4 ) ‖ sps_ibc_enabled_flag )  && | |
| CuPredMode[ x0 ][ y0 ] == MODE_INTRA )  ‖ | |
| ( slice_type != I  &&  !( cbWidth == 4 && cbHeight == 4 )  &&  !sps_ibc_enabled_flag | |
| &&  CuPredMode[ x0 ][ y0 ]!= MODE_INTRA ) )  && sps_palette_enabled_flag  && | |
| cbWidth <= 64  &&  cbHeight <= 64  &&  && cu_skip_flag[ x0 ][ y0 ] == 0  && | |
| modeType != MODE_INTER ) | |
| pred_mode_plt_flag | ae(v) |
| } | |
| if( CuPredMode[ chType ][ x0 ][ y0 ] == MODE_INTRA ) | |
| cu_act_enabled_flag | ae(v) |
| if( CuPredMode[ chType ][ x0 ][ y0 ]  ==  MODE_INTRA  ‖ | |
| CuPredMode[ chType ][ x0 ][ y0 ]  ==  MODE_PLT ) { | |
| if( treeType == SINGLE_TREE  ‖  treeType == DUAL_TREE_LUMA ) { | |
| if( pred_mode_plt_flag ) { | |
| if( treeType == DUAL_TREE_LUMA ) | |
| palette_coding( x0, y0, cbWidth, cbHeight, 0, 1 ) | |
| else  /* SINGLE_TREE */ | |
| palette_coding( x0, y0, cbWidth, cbHeight, 0, 3 ) | |
| } else { | |
| if( sps_bdpcm_enabled_flag  && | |
| cbWidth <= MaxTsSize  &&  cbHeight <= MaxTsSize ) | |
| intra_bdpcm_flag | ae(v) |
| if( intra_bdpcm_flag ) | |
| intra_bdpcm_dir flag | ae(v) |
| else { | |
| if( sps_mip_enabled_flag  && | |
| ( Abs( Log2( cbWidth ) − Log2( cbHeight ) ) <= 2 )  && | |
| cbWidth <= MaxTbSizeY  &&  cbHeight <= MaxTbSizeY ) | |
| intra_mip_flag[ x0 ][ y0 ] | ae(v) |
| if( intra_mip_flag[ x0 ][ y0 ] ) | |
| intra_mip_mode[ x0 ][ y0 ] | ae(v) |
| else { | |
| if( sps_mrl_enabled_flag  &&  ( ( y0 % CtbSizeY ) > 0 ) ) | |
| intra_luma_ref_idx[ x0 ][ y0 ] | ae(v) |
| if ( sps_isp_enabled_flag  && intra_luma_ref_idx[ x0 ][ y0 ] == 0  && | |
| ( cbWidth <= MaxTbSizeY  &&  cbHeight <= MaxTbSizeY )  && | |
| ( cbWidth * cbHeight > MinTbSizeY * MinTbSizeY ) && !cu_act_enabled_flag) | |
| intra_subpartitions_mode_flag[ x0 ][ y0 ] | ae(v) |
| if( intra_subpartitions_mode_flag[ x0 ][ y0 ] == 1 ) | |
| intra_subpartitions_split_flag[ x0 ][ y0 ] | ae(v) |
| if( intra_luma_ref_idx[ x0 ][ y0 ] == 0 ) | |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] == 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| } | |
| if( ( treeType == SINGLE_TREE  ‖  treeType == DUAL_TREE_CHROMA ) && | |

TABLE 3-continued

Specification for Signaling ACT Mode

| | Descriptor |
|---|---|
| ChromaArrayType != 0 ) { | |
|   if ( pred_mode_plt_flag  &&  treeType == DUAL_TREE_CHROMA ) | |
|     palette_coding( x0, y0, cbWidth / SubWidthC, cbHeight / SubHeightC, 1, 2 ) | |
|   else { | |
|     if( !cu_act_enabled_flag ) { | |
|     if( CclmEnabled ) | |
|       cclm_mode_flag | ae(v) |
|     if( cclm_mode_flag ) | |
|       cclm_mode_idx | ae(v) |
|     else | |
|       intra_chroma_pred_mode | ae(v) |
|     } | |
|   } | |
| } | |
| } else if( treeType != DUAL_TREE_CHROMA ) { /* MODE_INTER or MODE_IBC */ | |
|   if( cu_skip_flag[ x0 ][ y0 ] == 0 ) | |
|     general_merge_flag[ x0 ][ y0 ] | ae(v) |
|   if( general_merge_flag[ x0 ][ y0 ] ) { | |
|     merge_data( x0, y0, cbWidth, cbHeight, chType ) | |
|   } else if ( CuPredMode[ chType ][ x0 ][ y0 ]  == MODE_IBC ) { | |
|     mvd_coding( x0, y0, 0, 0 ) | |
|     if( MaxNumIbcMergeCand > 1 ) | |
|       mvp_l0_flag[ x0 ][ y0 ] | ae(v) |
|     if( sps_amvr_enabled_flag  && ( MvdL0[ x0 ][ y0 ][ 0 ] != 0  ||  MvdL0[ x0 ][ y0 ][ 1 ] != 0 ) ) { | |
|       amvr_precision_idx[ x0 ][ y0 ] | ae(v) |
|     } | |
|   } else { | |
|     if( slice_type == B ) | |
|       inter_pred_idc[ x0 ][ y0 ] | ae(v) |
|     if( sps_affine_enabled_flag  &&  cbWidth >=16  && cbHeight >= 16 ) { | |
|       inter_affine_flag[ x0 ][ y0 ] | ae(v) |
|       if( sps_affine_type_flag  &&  inter_affine_flag[ x0 ][ y0 ] ) | |
|         cu_affine_type_flag[ x0 ][ y0 ] | ae(v) |
|     } | |
|     if( sps_smvd_enabled_flag  &&  !mvd_l1_zero_flag && inter_pred_idc[ x0 ][ y0 ] == PRED_BI  && !inter_affine_flag[ x0 ][ y0 ]  &&  RefIdxSymL0 > -1 && RefIdxSymL1 > -1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvpl0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( NumRefIdxActive[ 1 ] > 1 && !sym_mvd_flag[ x0 ][ y0 ] ) | |
|         ref_idx_l1[ x0 ][ y0 ] | ae(v) |
|       if( mvd_l1_zero_flag  &&  inter_pred_idc[ x0 ][ y0 ] == PRED_BI ) { | |
|         MvdL1[ x0 ][ y0 ][ 0 ] = 0 | |
|         MvdL1[ x0 ][ y0 ][ 1 ] = 0 | |
|         MvdCpL1[ x0 ][ y0 ][ 0 ][ 0 ] = 0 | |
|         MvdCpL1[ x0 ][ y0 ][ 0 ][ 1 ] = 0 | |
|         MvdCpL1[ x0 ][ y0 ][ 1 ][ 0 ] = 0 | |
|         MvdCpL1[ x0 ][ y0 ][ 1 ][ 1 ] = 0 | |
|         MvdCpL1[ x0 ][ y0 ][ 2 ][ 0 ] = 0 | |
|         MvdCpL1[ x0 ][ y0 ][ 2 ][ 1 ] = 0 | |
|       } else { | |
|         if( sym_mvd_flag[ x0 ][ y0 ] ) { | |
|           MvdL1[ x0 ][ y0 ][ 0 ] = -MvdL0[ x0 ][ y0 ][ 0 ] | |
|           MvdL1[ x0 ][ y0 ][ 1 ] = -MvdL0[ x0 ][ y0 ][ 1 ] | |
|         } else | |
|           mvd_coding( x0, y0, 1, 0 ) | |
|         if( MotionModelIdc[ x0 ][ y0 ] > 0 ) | |
|           mvd_coding( x0, y0, 1, 1 ) | |
|         if(MotionModelIdc[ x0 ][ y0 ] > 1 ) | |
|           mvd_coding( x0, y0, 1, 2 ) | |
|         mvp_l1_flag[ x0 ][ y0 ] | ae(v) |
|       } | |
|     } else { | |
|       MvdL1[ x0 ][ y0 ][ 0 ] = 0 | |
|       MvdL1[ x0 ][ y0 ][ 1 ] = 0 | |
|     } | |
|     if( ( sps_amvr_enabled_flag  &&  inter_affine_flag[ x0 ][ y0 ] == 0  && ( MvdL0[ x0 ][ y0 ][ 0 ] != 0  ||  MvdL0[ x0 ][ y0 ][ 1 ] != 0  || MvdL1[ x0 ][ y0 ][ 0 ] != 0  ||  MvdL1[ x0 ][ y0 ][ 1 ] != 0 ) )  || ( sps_affine_amvr_enabled_flag  && inter_affine_flag[ x0 ][ y0 ] == 1  && ( MvdCpL0[ x0 ][ y0 ][ 0 ][0] != 0  || MvdCpL0[ x0 ][ y0 ][ 0 ][ 1 ] != 0  || MvdCpL1[ x0 ][ y0 ][ 0 ][0] != 0  || MvdCpL1[ x0 ][ y0 ][ 0 ][ 1 ] != 0  || MvdCpL0[ x0 ][ y0 ][ 1 ][0] != 0  || MvdCpL0[ x0 ][ y0 ][ 1 ][ 1 ] != 0  || MvdCpL1[ x0 ][ y0 ][ 1 ][0] != 0  || MvdCpL1[ x0 ][ y0 ][ 1 ][ 1 ] != 0  || MvdCpL0[ x0 ][ y0 ][ 2 ][0] != 0  || MvdCpL0[ x0 ][ y0 ][ 2 ][ 1 ] != 0  || MvdCpL1[ x0 ][ y0 ][ 2 ][0] != 0  || MvdCpL1[x0 ][y0 ][ 2 ][ 1 ]  != 0 ) ) { | |
|       amvr_flag[ x0 ][ y0 ] | ae(v) |
|       if( amvr_flag[ x0 ][ y0 ] ) | |
|         amvr_precision_idx[ x0 ][ y0 ] | ae(v) |
|     } | |
|     if( sps_bcw_enabled_flag  &&  inter_pred_idc[ x0 ][ y0 ] == PRED_BI  && luma_weight_l0_flag[ ref_idx_l0 [ x0 ][ y0 ] ] == 0  && luma_weight_l1_flag[ ref_idx_l1 [ x0 ][ y0 ] ] == 0  && chroma_weight_l0_flag[ ref_idx_l0 [ x0 ][ y0 ] ] == 0  && chroma_weight_l1_flag[ ref_idx_l1 [ x0 ][ y0 ] ] == 0  && cbWidth * cbHeight  >=  256 ) | |
|       bcw_idx[ x0 ][ y0 ] | ae(v) |
|   } | |
| } | |
| if( CuPredMode[ chType ][ x0 ][ y0 ] != MODE_INTRA && !pred_mode_plt_flag  && general_merge_flag[ x0 ][ y0 ] == 0 ) | |
|   cu_cbf | ae(v) |
| if( cu_cbf ) { | |
|   if( CuPredMode[ chType ][ x0 ][ y0 ] == MODE_INTER && sps_sbt_enabled_flag  && !ciip_flag[ x0 ][ y0 ] && !MergeTriangleFlag[ x0 ][ y0 ] ) { | |
|     if( cbWidth <= MaxSbtSize  &&  cbHeight <= MaxSbtSize ) { | |
|       allowSbtVerH  =  cbWidth >= 8 | |
|       allowSbtVerQ  =  cbWidth >= 16 | |
|       allowSbtHorH  =  cbHeight >= 8 | |
|       allowSbtHorQ  =  cbHeight >= 16 | |

TABLE 3-continued

Specification for Signaling ACT Mode

| | Descriptor |
|---|---|
| if( allowSbtVerH \|\| allowSbtHorH \|\| allowSbtVerQ \|\| allowSbtHorQ ) | |
|     cu_sbt_flag | ae(v) |
| } | |
| if( cu_sbt_flag ) { | |
|     if( ( allowSbtVerH \|\| allowSbtHorH ) && ( allowSbtVerQ \|\| allowSbtHorQ) ) | |
|         cu_sbt_quad_flag | ae(v) |
|     if(  (cu_sbt_quad_flag && allowSbtVerQ && allowSbtHorQ )  \|\| | |
|        ( !cu_sbt_quad_flag && allowSbtVerH && allowSbtHorH ) ) | |
|         cu_sbt_horizontal_flag | ae(v) |
|     cu_sbt_pos_flag | ae(v) |
| } | |
|    if( sps_act_enabled_flag && CuPredMode[ chType ][ x0 ][ y0 ] != MODE_INTRA ) | |
|     cu_act_enabled flag | ae(v) |
| } | |
| LfnstDcOnly = 1 | |
| LfnstZeroOutSigCoeffFlag = 1 | |
| transform_tree( x0, y0, cbWidth, cbHeight, treeType ) | |
| lfnstWidth = ( treeType  = = DUAL_TREE_CHROMA ) ? cbWidth/ SubWidthC | |
|    : cbWidth | |
| lfnstHeight = (treeType   = = DUAL_TREE_CHROMA ) ? cbHeight / SubHeightC | |
|    : cbHeight | |
|   if( Min( lfnstWidth, lfnstHeight )  >=  4  && | |
|   sps_lfnst_enabled_flag  = =  1   && | |
|   CuPredMode[ chType ][ x0 ][ y0 ]  = =   MODE_INTRA && IntraSubPartitionsSplitType  = =  ISP_NO_SPLIT   && | |
|    ( !intra_mip_flag[ x0 ][ y0 ]   \|\|   Min( lfnstWidth, lfnstHeight )  >=  16  )   && | |
|   tu_mts_idx[ x0 ][ y0 ]   = =   0 &&  Max( cbWidth, cbHeight )  <=   MaxTbSizeY) { | |
|     if( LfnstDcOnly   = =   0 && LfnstZeroOutSigCoeffFlag   = = 1 ) | |
|       lfnst_idx[ x0 ][ y0 ] | ae(v) |
|  } | |
| } | |

The flag cu_act_enabled_flag equal to 1 indicates that the residuals of the coding unit are coded in the YCgCo color space and the flag cu_act_enabled_flag equal to 0 indicates that the residuals of the coding unit are coded in the original color space (e.g., RGB or YCbCr). When the flag cu_act_enabled_flag is not present, it is inferred to be equal to 0.

In the current VVC working draft, when the input video is captured in 4:4:4 chroma format, a transform skip mode can be applied to both the luma and chroma components. Based on such design, in some embodiments, three methods are used in the following to handle the interaction between the ACT and the transform skip.

In one method, when the transform skip mode is enabled for one ACT CU, the transform skip mode is only applied to the luma component but not applied to the chroma components. In some embodiments, the syntax design specification for such method is illustrated in the following table.

TABLE 4

Syntax specification when the transform skip mode is only applied to the luma component

| | Descriptor |
|---|---|
| transform_unit( x0, y0, tbWidth, tbHeight, treeType, subTuIndex, chType ) { | |
| ... ... | |
|   if( tu_cbf_luma[ x0 ][ y0 ]   && treeType != DUAL_TREE_CHROMA ) { | |
|     if( sps_transform_skip_enabled_flag   && !BdpcmFlag[ x0 ][ y0 ][ 0 ]   &&.. | |
|        tbWidth   <=   MaxTsSize   &&   tbHeight   <=   MaxTsSize && | |
|        ( IntraSubPartitionsSplit[ x0 ][ y0 ]  = =  ISP_NO_SPLIT )   && !cu_sbt_flag ) | |
|       transform_skip_flag[ x0 ][ y0 ][ 0 ] | ae(v) |
|     if( !transform_skip_flag[ x0 ][ y0 ] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   if( tu_cbf_cb[ x0 ][ y0 ]   &&    treeType != DUAL_TREE_LUMA ) | |
|     if( sps_transform_skip_enabled_flag   && !BdpcmFlag[ x0 ][ y0 ][ 1 ]   && | |
|        wC   <=   MaxTsSize   &&   hC   <=   MaxTsSize   && !cu_sbt_flag && cu_act_enabled_flag ) | |
|       transform_skip_flag[ x0 ][ y0 ][ 1 ] | ae(v) |
|     if( !transform_skip_flag[ x0 ][ y0 ][ 1 ] ) | |
|       residual_coding( xC, yC, Log2( wC ), Log2( hC ), 1 ) | |
|     else | |
|       residual_ts_coding( xC, yC, Log2( wC ), Log2( hC ), 1 ) | |
|   if( tu_cbf_cr[ x0 ][ y0 ]   &&    treeType != DUAL_TREE_LUMA && | |
|     !( tu_cbf_cb[ x0 ][ y0 ]   && tu_joint_cbcr_residual_flag[ x0 ][ y0 ] )) { | |
|     if( sps_transform_skip_enabled_flag   && !BdpcmFlag[ x0 ][ y0 ][ 2 ]   && | |
|        wC   <=   MaxTsSize   &&   hC   <=   MaxTsSize   && !cu_sbt_flag && cu_act_enabled_flag ) | |
|       transform_skip_flag [ x0 ][ y0 ][ 2 ] | ae(v) |
|     if( !transform_skip_flag[ x0 ][ y0 ][ 2 ] ) | |
|       residual_coding( xC, yC, Log2( wC ), Log2( hC ), 2 ) | |
|     else | |
|       residual_ts_coding( xC, yC, Log2( wC ), Log2( hC ), 2 ) | |

In another method, the transform skip mode is applied to both the luma and chroma components. In some embodiments, the syntax design specification for such method is illustrated in the following table.

TABLE 5

Syntax specification when the transform skip mode is applied to both the luma and chroma components

| | Descriptor |
|---|---|
| transform_unit( x0, y0, tbWidth, tbHeight, treeType, subTuIndex, chType ) { | |
| ... ... | |
|   if( tu_cbf_luma[ x0 ][ y0 ]   && treeType != DUAL_TREE_CHROMA ) { | |
|     if( sps_transform_skip_enabled_flag   && !BdpcmFlag[ x0 ][ y0 ][ 0 ]   &&.. | |
|        tbWidth   <=   MaxTsSize   &&   tbHeight   <=   MaxTsSize && | |
|        ( IntraSubPartitionsSplit[ x0 ][ y0 ]  = =  ISP_NO_SPLIT )   && !cu_sbt_flag ) | |
|       transform_skip_flag[ x0 ][ y0 ][ 0 ] | ae(v) |
|     if( !transform_skip_flag[ x0 ][ y0 ] ) | |

TABLE 5-continued

Syntax specification when the transform skip mode is applied to both the luma and chroma components

| | Descriptor |
|---|---|
| residual_coding( x0, y0, Log2( tbWidth), Log2( tbHeight ), 0 )<br>else<br>    residual_ts_coding( x0, y0, Log2( tbWidth ), Log2( tbHeight), 0 )<br>}<br>if( tu_cbf_cb[ x0 ][ y0 ]   &&   treeType != DUAL_TREE_LUMA )<br>    if( sps_transform_skip_enabled_flag   &&<br>!BdpcmFlag[ x0 ][ y0 ][ 1 ]   &&<br>        wC  <=   MaxTsSize   &&   hC   <=   MaxTsSize   &&<br>!cu_sbt_flag )<br>        transform_skip_flag[ x0 ][ y0 ][ 1 ]<br>        if( !transform_skip_flag[ x0 ][ y0 ][ 1 ] )<br>            residual_coding( xC, yC, Log2( wC ), Log2( hC ), 1 )<br>        else<br>            residual_ts_coding( xC, yC, Log2( wC ), Log2( hC ), 1 )<br>if( tu_cbf_cr[ x0 ][ y0 ]   &&   treeType != DUAL_TREE_LUMA   &&<br>    !( tu_cbf_cb[ x0 ][ y0 ]   &&<br>tu_joint_cbcr_residual_flag[ x0 ][ y0 ] )) {<br>        if( sps_transform_skip_enabled_flag   &&<br>!BdpcmFlag[ x0 ][ y0 ][ 2 ]   &&<br>            wC  <=   MaxTsSize   &&   hC   <=   MaxTsSize   &&<br>!cu_sbt_flag )<br>            transform_skip_flag [ x0 ][ y0 ][ 2 ]<br>            if( !transform_skip_flag[ x0 ][ y0 ][ 2 ] )<br>                residual_coding( xC, yC, Log2( wC ), Log2( hC ), 2 )<br>            else<br>                residual_ts_coding( xC, yC, Log2( wC ), Log2( hC ), 2 ) | <br><br><br><br><br><br><br><br><br><br><br>ae(v)<br><br><br><br><br><br><br><br><br><br><br>ae(v) |

In yet another method, the transform skip mode is always disabled when the ACT is enabled to one CU. In some embodiments, the syntax design specification for such method is illustrated in the following table.

TABLE 6

Syntax specification when the transform skip mode is always disabled

| | Descriptor |
|---|---|
| transform_unit( x0, y0, tbWidth, tbHeight, treeType, subTuIndex, chType ) {<br>... ...<br>if( tu_cbf_luma[ x0 ] [ y0 ]   &&<br>treeType !=   DUAL_TREE_CHROMA ) {<br>    if( sps_transform_skip_enabled_flag   &&<br>!BdpcmFlag[ x0 ][ y0 ][ 0 ]   &&..<br>        tbWidth  <=   MaxTsSize   &&   tbHeight   <= MaxTsSize   &&<br>        ( IntraSubPartitionsSplit[ x0 ][ y0 ] = = ISP_NO_SPLIT )   && !cu_sbt_flag &&<br>        ! cu_act_enabled_flag )<br>        transform_skip_flag[ x0 ][ y0 ][ 0 ]<br>        if( !transform_skip_flag[ x0 ][ y0 ] )<br>            residual_coding( x0, y0, Log2( tbWidth ), Log2( tbHeight ), 0 )<br>        else<br>            residual_ts_coding( x0, y0, Log2( tbWidth ), Log2( tbHeight ), 0 )<br>    }<br>    if( tu_cbf_cb[ x0 ][ y0 ]   &&   treeType != DUAL_TREE_LUMA )<br>        if( sps_transform_skip_enabled_flag   &&<br>!BdpcmFlag[ x0 ][ y0 ][ 1 ]   &&<br>            wC  <=   MaxTsSize   &&   hC   <= | <br><br><br><br><br><br><br><br><br><br>ae(v) |

TABLE 6-continued

Syntax specification when the transform skip mode is always disabled

| | Descriptor |
|---|---|
| MaxTsSize   && !cu_sbt_flag && cu_act_enabled_flag )<br>            transform_skip_flag[ x0 ][ y0 ][ 1 ]<br>            if( !transform_skip_flag[ x0 ][ y0 ][ 1 ] )<br>                residual_coding( xC, yC, Log2( wC ), Log2( hC ), 1 )<br>            else<br>                residual_ts_coding( xC, yC, Log2( wC ), Log2( hC ), 1 )<br>    if( tu_cbf_cr[ x0 ][ y0 ]   &&   treeType != DUAL_TREE_LUMA &&<br>        !( tu_cbf_cb[ x0 ][ y0 ]   &&<br>tu_joint_cbcr_residual_flag[ x0 ][ y0 ] )) {<br>            if( sps_transform_skip_enabled_flag   &&<br>!BdpcmFlag[ x0 ][ y0 ][ 2 ]   &&<br>                wC  <=   MaxTsSize   &&   hC   <= MaxTsSize   && !cu_sbt_flag && cu_act_enabled_flag )<br>                transform_skip_flag [ x0 ][ y0 ][ 2 ]<br>                if( !transform_skip_flag[ x0 ][ y0 ][ 2 ] )<br>                    residual_coding( xC, yC, Log2( wC ), Log2( hC ), 2 )<br>                else<br>                    residual_ts_coding( xC, yC, Log2( wC ), Log2( hC ), 2 ) | ae(v)<br><br><br><br><br><br><br><br><br>ae(v) |

Figure 8A:
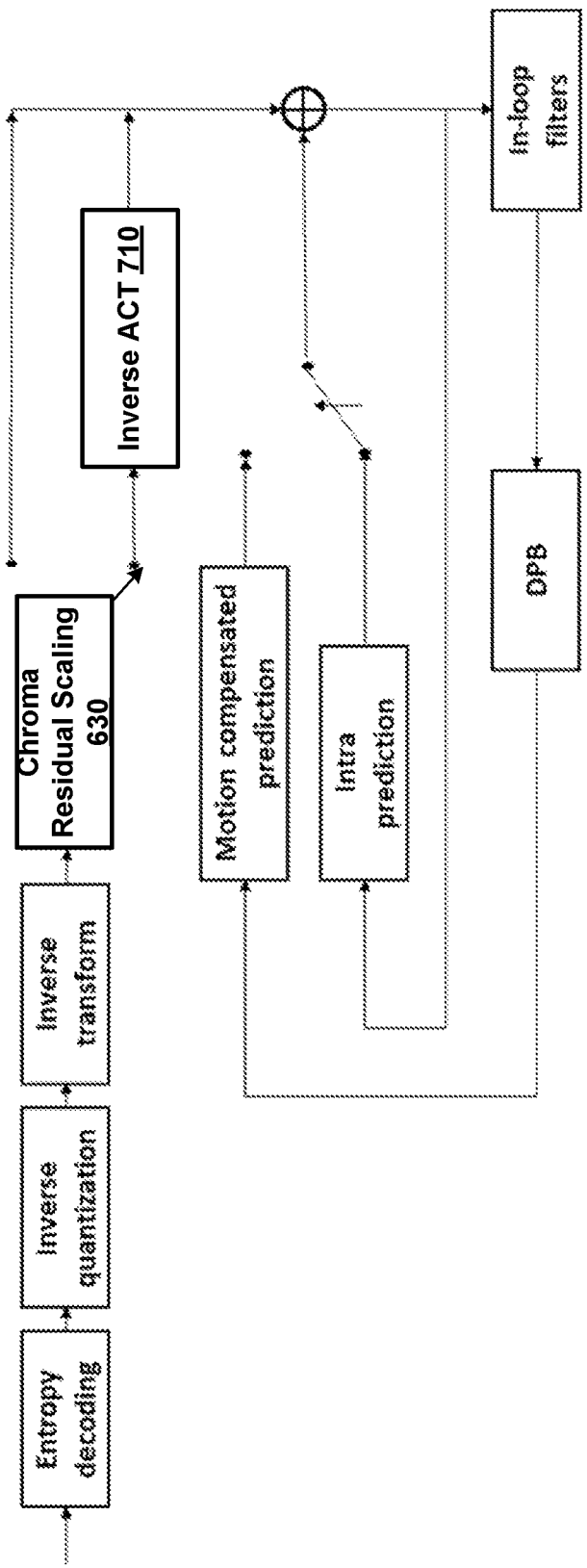
FIGS. 8A and 8B are block diagrams illustrating exemplary video decoding processes by which a video decoder implements the technique of inverse adaptive color-space transform (ACT) and luma mapping with chroma scaling (LMCS) in accordance with some implementations of the present disclosure.
Figure 8B:
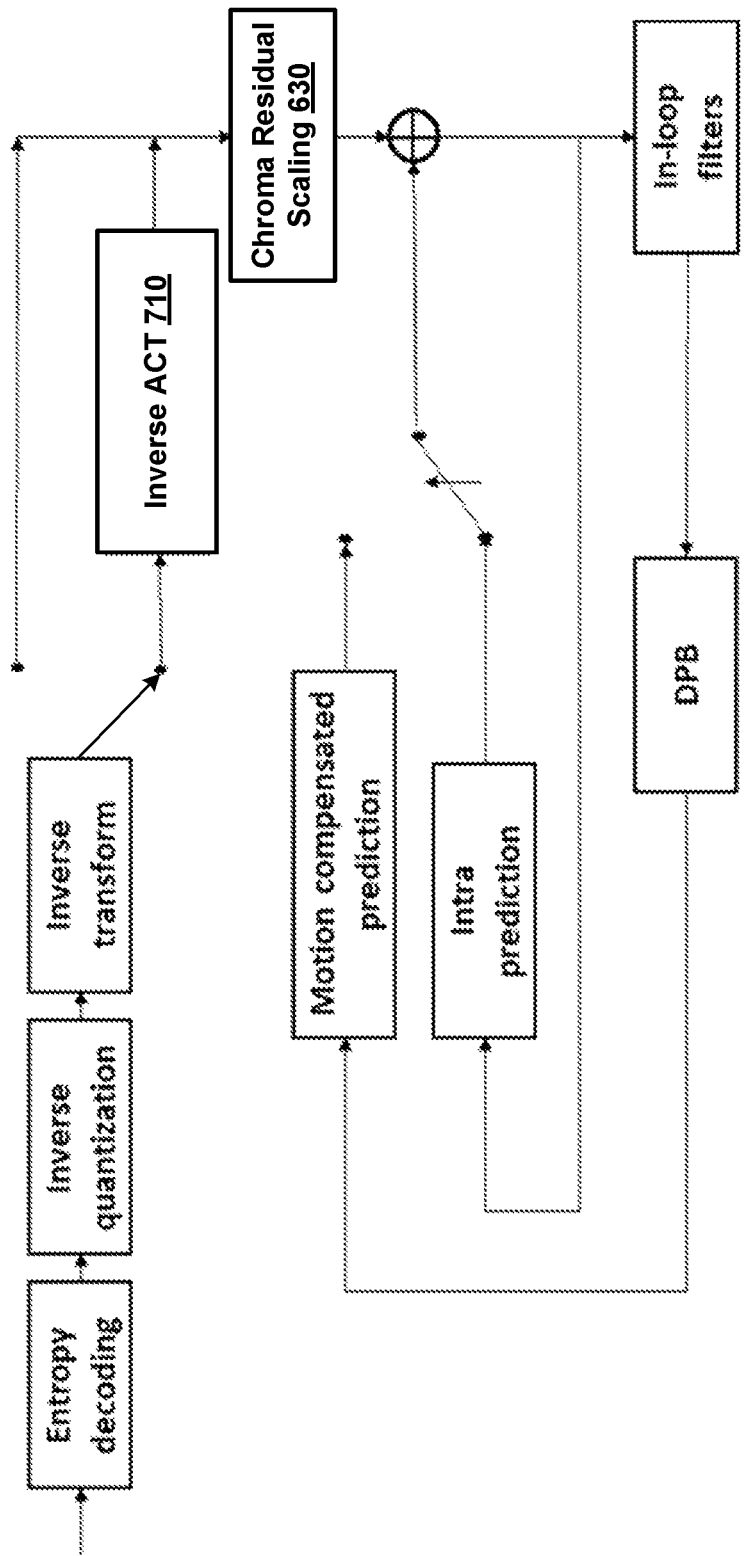

FIGS. 8A and 8B are block diagrams illustrating exemplary video decoding processes by which a video decoder implements the technique of inverse adaptive color-space transform (ACT) and luma mapping with chroma scaling in accordance with some implementations of the present disclosure. In some embodiments, the video bitstream is coded using both ACT (e.g., inverse ACT 710 in FIG. 7) and chroma residual scaling (e.g., chroma residual scaling 630 in FIG. 6). In some other embodiments, the video bitstream is coded using chroma residual scaling but not both ACT, thereby not requiring the inverse ACT 710.

More specifically, FIG. 8A depicts an embodiment in which the video coder performs chroma residual scaling 630 before inverse ACT 710. As a result, the video coder performs luma mapping with chroma residual scaling 630 in the color-space transformed domain. For example, assuming that the input video is captured in RGB format and is transformed into YCgCo color space, the video coder performs chroma residual scaling 630 on the chroma residuals Cg and Co according to the luma residuals Y in the YCgCo color space.

FIG. 8B depicts an alternative embodiment in which the video coder performs chroma residual scaling 630 after the inverse ACT 710. As a result, the video coder performs luma mapping with chroma residual scaling 630 in the original color-space domain. For example, assuming the input video is captured in RGB format, the video coder applies chroma residual scaling on the B and R components.

Figure 9:
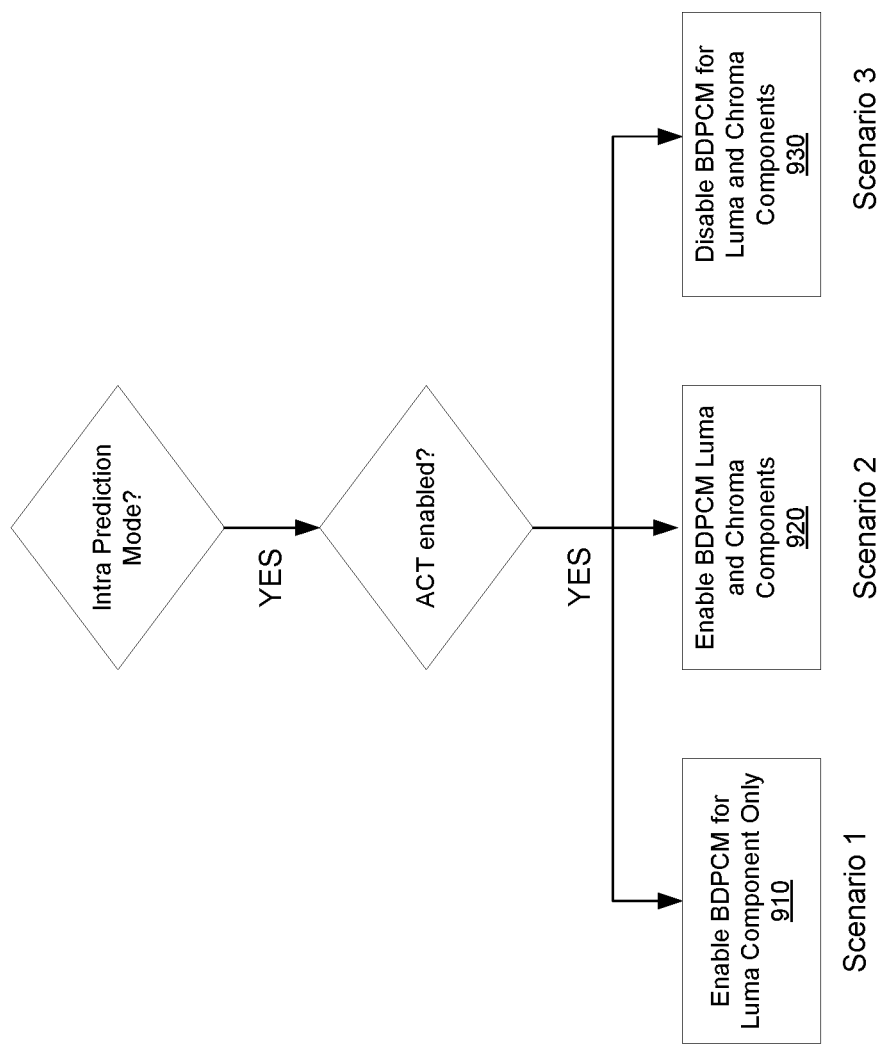
FIG. 9 is a block diagram illustrating exemplary decoding logics between performing adaptive color-space transform (ACT) and block differential pulse coded modulation (BDPCM) in accordance with some implementations of the present disclosure.

FIG. 9 is a block diagram illustrating exemplary decoding logics between performing adaptive color-space transform (ACT) and block differential pulse coded modulation (BDPCM) in accordance with some implementations of the present disclosure.

BDPCM is a coding tool for screen content coding. In some embodiments, a BDPCM enable flag is signaled in the SPS at the sequence level. The BDPCM enable flag is signaled only if the transform skip mode is enabled in the SPS.

When BDPCM is enabled, a flag is transmitted at the CU level if the CU size is smaller than or equal to MaxTsSize×MaxTsSize in terms of luma samples and if the CU is intra coded, where MaxTsSize is the maximum block size for which the transform skip mode is allowed. This flag indicates whether regular intra coding or BDPCM is used. If BDPCM is used, another BDPCM prediction direction flag is further transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on BDPCM prediction direction) neighbouring position, is coded.

For a block of size M (height)×N (width), let $r_{i,j}$, $0 \leq i \leq M-1$, $0 \leq j \leq N-1$ be the prediction residual. Let $Q(r_{i,j})$ $0 \leq i \leq M-1$, $0 \leq j \leq N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0 \leq j \leq (N-1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \leq i \leq (M-1) \end{cases} \quad (1)$$

For horizontal BDPCM prediction mode, for $0 \leq i \leq (M-1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \leq j \leq (N-1) \end{cases} \quad (2)$$

At the decoder side, the above process is reversed to compute $Q(r_{i,j})$, $0 \leq i \leq M-1$, $0 \leq j \leq N-1$, as follows:

$$Q(r_{i,j}) = \Sigma_{k=0}^{i} \tilde{r}_{k,j}, \text{ if vertical BDPCM is used} \quad (3)$$

$$Q(r_{i,j}) = \Sigma_{k=0}^{j} \tilde{r}_{i,k}, \text{ if horizontal BDPCM is used} \quad (4)$$

The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. In terms of the MPM mode for future intra mode coding, horizontal or vertical prediction mode is stored for a BDPCM-coded CU if BDPCM prediction direction is horizontal or vertical, respectively. For deblocking, if both blocks on the sides of a block boundary are coded using BDPCM, then that particular block boundary is not deblocked. According to the latest VVC working draft, when the input video is 4:4:4 chroma format, BDPCM can be applied to both luma and chroma components by signaling two separate flags, i.e., intra_bdpcm_luma_flag and ultra_bdpcm_chroma_flag, for luma and chroma channel at CU-level.

In some embodiments, the video coder performs different logics to handle the interaction between ACT and BDPCM. For example, when ACT is applied to one intra CU, BDPCM is enabled for luma component but disabled for chroma components (910). In some embodiments, when ACT is applied to one intra CU, BDPCM is enabled for the luma component but disabled for the signaling of BDPCM for the chroma components. When the signaling of the chroma BDPCM is bypassed, in one embodiment, the values of intra_bdpcm_chroma_flag and intra_bdpcm_chroma_dir are equal to those of the luma component, i.e., intra_bdpcm_flag and intra_bdpcm_dir_flag (i.e., using the same BDPCM direction of luma for chroma BDPCM). In another embodiment, the values of intra_bdpcm_chroma_flag and intrra_bdpcm_chroma_dir_flag are set to be zero when they are signaled for the ACT mode (i.e., disabling the chroma BDPCM mode for the chroma component). The corresponding modified syntax table of coding unit is illustrated as follows:

TABLE 7

BDPCM enabled for luma component only

| | Descriptor |
|---|---|
| coding_unit( x0, y0, cbWidth, cbHeight, cqtDepth, treeType, modeType ) { | |
| ... ... | |
|   if( CuPredMode[ chType ][ x0 ][ y0 ] == MODE_INTRA && treeType == SINGLE_TREE ) | |
|     cu_act_enabled_flag | ae(v) |
|   if( CuPredMode[ chType ][ x0 ][ y0 ] == MODE_INTRA \|\| CuPredMode[ chType ][ x0 ][ y0 ] == MODE_PLT ) { | |
|     if( treeType == SINGLE_TREE \|\| treeType == DUAL_TREE_LUMA ) { | |
|       if( pred_mode_plt_flag ) { | |
|         if( treeType == DUAL_TREE_LUMA ) | |
|           palette_coding( x0, y0, cbWidth, cbHeight, 0, 1 ) | |
|         else  /* SINGLE_TREE */ | |
|           palette_coding( x0, y0, cbWidth, cbHeight, 0, 3 ) | |
|       } else { | |
|         if( sps_bdpcm_enabled_flag && cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|         else { | |
|           if( sps_mip_enabled_flag && ( Abs( Log2( cbWidth ) − Log2( cbHeight ) ) <= 2 ) && cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) | |
|             intra_mip_mode[ x0 ][ y0 ] | ae(v) |
|           else { | |
|             if( sps_mrl_enabled_flag && ( ( y0 % CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] == 0 && ( cbWidth <= MaxTbSizeY && cbHeight <= MaxTbSizeY ) && ( cbWidth * cbHeight > MinTbSizeY * MinTbSizeY ) && !cu_act_enabled_flag) | |
|               intra_subpartitions_mode_flag[ x0 ][ y0 ] | ae(v) |
|             if( intra_subpartitions_mode_flag[ x0 ][ y0 ] == 1 ) | |
|               intra_subpartitions_split_flag[ x0 ][ y0 ] | ae(v) |
|             if( intra_luma_ref_idx[ x0 ][ y0 ] == 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] == 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |
|         } | |
|       } | |
|     } | |
|     if( ( treeType == SINGLE_TREE \|\| treeType == DUAL_TREE_CHROMA ) && ChromaArrayType != 0 ) { | |
|       if ( pred_mode_plt_flag && treeType == | |

TABLE 7-continued

BDPCM enabled for luma component only

| | Descriptor |
|---|---|
| DUAL_TREE_CHROMA ) | |
|     palette_coding( x0, y0, cbWidth / SubWidthC, cbHeight / SubHeightC, 1, 2 ) | |
|     else { | |
|         if( !cu_act_enabled_flag ) { | |
|             if( cbWidth <= MaxTsSize && cbHeight <= MaxTsSize && | |
|                 sps_bdpcm_chroma_enabled_flag ) { | |
|                 intra_bdpcm_chroma_flag | ae(v) |
|                 if( intra_bdpcm_chroma_flag ) | |
|                     intra_bdpcm_chroma_dir_flag | ae(v) |
|         } else { | |
|             if( CclmEnabled ) | |
|                 cclm_mode_flag | ae(v) |
|             if( cclm_mode_flag ) | |
|                 cclm_mode_idx | ae(v) |
|             else | |
|                 intra_chroma_pred_mode | ae(v) |
|         } | |
|     } | |
| } | |
| ... ... | |
| } | |

In some embodiments, BDPCM is enabled for both luma and chroma components when ACT is applied to one intra CU (920). The corresponding modified syntax table of coding unit is illustrated as follows:

TABLE 8

BDPCM enabled for both luma and chroma components

| | Descriptor |
|---|---|
| coding_unit( x0, y0, cbWidth, cbHeight, cqtDepth, treeType, modeType) { | |
| ... ... | |
|   if( CuPredMode[ chType ][ x0 ][ y0 ] == MODE_INTRA && treeType == SINGLE_TREE ) | |
|     cu_act_enabled_flag | ae(v) |
|   if( CuPredMode[ chType ][ x0 ][ y0 ] == MODE_INTRA \|\| CuPredMode[ chType ][ x0 ][ y0 ] == MODE_PLT ) { | |
|     if( treeType == SINGLE_TREE \|\| treeType == DUAL_TREE_LUMA ) { | |
|       if( pred_mode_plt_flag ) { | |
|         if( treeType == DUAL_TREE_LUMA ) | |
|           palette_coding( x0, y0, cbWidth, cbHeight, 0, 1 ) | |
|         else  /* SINGLE_TREE */ | |
|           palette_coding( x0, y0, cbWidth, cbHeight, 0, 3 ) | |
|       } else { | |
|         if( sps_bdpcm_enabled_flag && cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | |
|         else { | |
|           if( sps_mip_enabled_flag && ( Abs( Log2( cbWidth ) − Log2( cbHeight ) ) <= 2 ) && cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) | |
|             intra_mip_mode[ x0 ][ y0 ] | ae(v) |
|         else { | |
|           if( sps_mrl_enabled_flag && ( ( y0 % CtbSizeY ) > 0 ) ) | |
|             intra_luma_ref_idx[ x0 ][ y0 ] | ae(v) |
|           if ( sps_isp_enabled_flag && intra_luma_ref_idx[ x0 ][ y0 ] == 0 && ( cbWidth <= MaxTbSizeY && cbHeight <= MaxTbSizeY ) && ( cbWidth * cbHeight > MinTbSizeY * MinTbSizeY ) && !cu_act_enabled_flag) | |
|             intra_subpartitions_mode_flag[ x0 ][ y0 ] | ae(v) |
|           if( intra_subpartitions_mode_flag[ x0 ][ y0 ] == 1 ) | |
|             intra_subpartitions_split_flag[ x0 ][ y0 ] | ae(v) |
|           if( intra_luma_ref_idx[ x0 ][ y0 ] == 0 ) | |
|             intra_luma_mpm_flag[ x0 ][ y0 ] | ae(v) |
|           if( intra_luma_mpm_flag[ x0 ][ y0 ] ) { | |
|             if( intra_luma_ref_idx[ x0 ][ y0 ] == 0 ) | |
|               intra_luma_not_planar_flag[ x0 ][ y0 ] | ae(v) |
|             if( intra_luma_not_planar_flag[ x0 ][ y0 ] ) | |
|               intra_luma_mpm_idx[ x0 ][ y0 ] | ae(v) |
|           } else | |
|             intra_luma_mpm_remainder[ x0 ][ y0 ] | ae(v) |
|         } | |
|       } | |
|     } | |
|     if( (treeType == SINGLE_TREE \|\| treeType == DUAL_TREE_CHROMA ) && ChromaArrayType != 0 ) { | |
|       if ( pred_mode_plt_flag && treeType == DUAL_TREE_CHROMA ) | |
|         palette_coding( x0, y0, cbWidth / SubWidthC, cbHeight / SubHeightC, 1, 2 ) | |
|       else { | |
|         if( cbWidth <= MaxTsSize && cbHeight <= MaxTsSize && sps_bdpcm_chroma_enabled_flag ) { | |
|           intra_bdpcm_chroma_flag | ae(v) |
|           if( intra_bdpcm_chroma_flag ) | |
|             intra_bdpcm_chroma_dir_flag | ae(v) |
|         } else { | |
|           if( !cu_act_enabled_flag ) { | |
|             if( CclmEnabled ) | |
|               cclm_mode_flag | ae(v) |
|             if( cclm_mode_flag ) | |
|               cclm_mode_idx | ae(v) |
|             else | |
|               intra_chroma_pred_mode | ae(v) |
|           } | |
|         } | |
|       } | |
|     } | |
| ... ... | |
| } | |

In some embodiments, BDPCM is disabled for both luma and chroma components when ACT is applied to one intra CU (930). In such case, there is no need for signaling the BDPCM related syntax element. The corresponding modified syntax table of coding unit is illustrated as follows:

TABLE 9

BDPCM is disabled for both luma and chroma components

| | Descriptor |
|---|---|
| coding_unit( x0, y0, cbWidth, cbHeight, cqtDepth, treeType, modeType ) { | |
| ... ... | |
|   if( CuPredMode[ chType ][ x0 ][ y0 ] == MODE_INTRA && treeType == SINGLE_TREE ) | |
|     cu_act_enabled_flag | ae(v) |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else  /* SINGLE_TREE */ | |
|           palette_coding( x0, y0, cbWidth, cbHeight, 0, 3 ) | |
|       } else { | |
|         if( sps_bdpcm_enabled_flag && cbWidth <= MaxTsSize && cbHeight <= MaxTsSize && !cu_act_enabled_flag ) | |
|           intra_bdpcm_flag | ae(v) |
|         if( intra_bdpcm_flag ) | |
|           intra_bdpcm_dir_flag | ae(v) |
|         else { | |
|           if( sps_mip_enabled_flag && ( Abs( Log2( cbWidth ) - Log2( cbHeight ) ) <= 2 ) && cbWidth <= MaxTbSizeY && cbHeight <= MaxTbSizeY ) | |
|             intra_mip_flag[ x0 ][ y0 ] | ae(v) |
|           if( intra_mip_flag[ x0 ][ y0 ] ) | |
|             intra_mip_mode[ x0 ][ y0 ] | ae(v) |
|           else { | |
|             if( sps_mrl_enabled_flag && ( ( y0 % CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) && !cu_act_enabled_flag) | |
|               intra_subpartitions_mode_flag[ x0 ][ y0 ] | ae(v) |
|             if( intra_subpartitions_mode_flag[ x0 ][ y0 ] = = 1 ) | |
|               intra_subpartitions_split_flag[ x0 ][ y0 ] | ae(v) |
|             if( intra_luma_ref_idx[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |
|         } | |
|       } | |
|     } | |
|     if( ( treeType = = SINGLE_TREE \|\| treeType = = DUAL_TREE_CHROMA ) && ChromaArrayType != 0 ) { | |
|       if ( pred_mode_plt_flag && treeType = = DUAL_TREE_CHROMA ) | |
|         palette_coding( x0, y0, cbWidth / SubWidthC, cbHeight / SubHeightC, 1, 2 ) | |
|       else { | |
|         if( !cu_acl_enabled_flag ) { | |
|           if( cbWidth <= MaxTsSize && cbHeight <= MaxTsSize && sps_bdpcm_chroma_enabled_flag ) { | |
|             intra_bdpcm_chroma_flag | ae(v) |
|             if( intra_bdpcm_chroma_flag ) | |
|               intra_bdpcm_chroma_dir_flag | ae(v) |
|           } else { | |
|             if( CclmEnabled ) | |
|               cclm_mode_flag | ae(v) |
|             if( cclm_mode_flag ) | |
|               cclm_mode_idx | ae(v) |
|             else | |
|               intra_chroma_pred_mode | ae(v) |
|           } | |
|         } | |
|       } | |
|     } | |
| } | |

In some embodiments, one constrained chroma BDPCM signaling method is used for the ACT mode. Specifically, the signaling of the chroma BDPCM enabling/disabling flag, i.e., intra_bdpcm_chroma_flag, is conditioned on the presence of the luma BDPCM, i.e., intra_bdpcm_flag, when the ACT is applied. The flag intra_bdpcm_chroma_flag is only signaled when the flag intra_bdpcm_flag is equal to one (i.e., the luma BDPCM mode is enabled). Otherwise, the flag intra_bdpcm_chroma_flag is inferred to be zero (i.e., the chroma BDPCM is disabled). When the flag intra_bdpcm_chroma_flag is equal to one (i.e., the chroma BDPCM is enabled), the applied BDPCM direction for the chroma components is always set to be equal to the luma BDPCM direction, i.e., the value of the flag intra_bdpcm_chroma_dir_flag is always set to be equal to the value of intra_bdpcm_dir_flag. The corresponding modified syntax table of coding unit is illustrated as follows:

TABLE 10

Conditioning the signaling of the chroma BDPCM enabling/disabling flag on the presence of the luma BDPCM

| | Descriptor |
|---|---|
| coding_unit( x0, y0, cbWidth, cbHeight, cqtDepth, treeType, modeType ) { | |
| ... ... | |
|   if(sps_act_enabled_flag && CuPredMode[ chType ][ x0 ][ y0 ] == MODE_INTRA && treeType == SINGLE_TREE ) | |
|     cu_act_enabled_flag | ae(v) |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else  /* SINGLE_TREE */ | |
|           palette_coding( x0, y0, cbWidth, cbHeight, 0, 3 ) | |
|       } else { | |
|         if( sps_bdpcm_enabled_flag && cbWidth <= MaxTsSize && cbHeight <= MaxTsSize ) | |
|           intra_bdpcm_flag | ae(v) |
|         if( intra_bdpcm_flag ) | |

TABLE 10-continued

Conditioning the signaling of the chroma BDPCM enabling/disabling flag on the presence of the luma BDPCM

| | Descriptor |
|---|---|
| intra_bdpcm_dir_flag | ae(v) |
| else { | |
|   if( sps_mip_enabled_flag && | |
|   ( Abs( Log2( cbWidth ) − Log2( | |
| cbHeight ) ) <= 2 ) && cbWidth <= | |
| MaxTbSizeY && cbHeight <= MaxTbSizeY ) | |
|     intra_mip_flag[ x0 ][ y0 ] | ae(v) |
|   if( intra_mip_flag[ x0 ][ y0 ] ) | |
|     intra_mip_mode[ x0 ][ y0 ] | ae(v) |
|   else { | |
|     if( sps_mrl_enabled_flag && ( ( y0 % | |
| CtbSizeY ) > 0 ) ) | |
|       intra_luma_ref_idx[ x0 ][ y0 ] | ae(v) |
|   if ( sps_isp_enabled_flag && | |
| intra_luma_ref_idx[ x0 ][ y0 ] = = 0 && | |
|     ( cbWidth <= MaxTbSizeY && | |
| cbHeight <= MaxTbSizeY ) && | |
|     ( cbWidth * cbHeight > MinTbSizeY * | |
| MinTbSizeY ) && !cu_act_enabled_flag) | |
|       intra_subpartitions_mode_flag[ x0 ][ y0 ] | ae(v) |
|     if( intra_subpartitions_mode_flag[ x0 ][ | |
| y0 ] = = 1 ) | |
|       intra_subpartitions_split_flag[ x0 ][ y0 ] | ae(v) |
|   if( intra_luma_ref_idx[ x0 ][ y0 ] = = 0 ) | |
|     intra_luma_mpm_flag[ x0 ][ y0 ] | ae(v) |
|   if( intra_luma_mpm_flag[ x0 ][ y0 ] ) { | |
|     if( intra_luma_ref_idx[ x0 ][ y0 ] = = 0 ) | |
|       intra_luma_not_planar_flag[ x0 ][ y0 ] | ae(v) |
|     if( intra_luma_not_planar_flag[ x0 ][ y 0 ] ) | |
|       intra_luma_mpm_idx[ x0 ][ y0 ] | ae(v) |
|   } else | |
|     intra_luma_mpm_remainder[ x0 ][ y0 ] | ae(v) |
|   } | |
|   } | |
|   f | |
| } | |
| if( ( treeType = = SINGLE_TREE | | treeType = = | |
| DUAL_TREE_CHROMA) && | |
|   ChromaArrayType != 0 ) { | |
|   if ( pred_mode_plt_flag && treeType = = | |
| DUAL_TREE_CHROMA ) | |
|     palette_coding( x0, y0, cbWidth / SubWidthC, | |
| cbHeight / SubHeightC, 1, 2 ) | |
|   else { | |
|     if( cbWidth <= | |
| MaxTsSize && cbHeight <= MaxTsSize && | |
| (!cu_act_enabled_flag || intra_bdpcm_flag) && | |
| sps_bdpcm_chroma_enabled_flag ) { | |
|       intra_bdpcm_chroma_flag | ae(v) |
|     if( intra_bdpcm_chroma_flag && | |
| !cu_act_enabled_flag ) | |
|       intra_bdpcm_chroma_dir_flag | ae(v) |
|   } else { | |
|     if( !cu_act_enabled_flag ) { | |
|       if( CclmEnabled ) | |
|       cclm_mode_flag | ae(v) |
|       if( cclm_mode_flag ) | |
|       cclm_mode_idx | ae(v) |
|       else | |
|       intra_chroma_pred_mode | ae(v) |
|     } | |
|     } | |
|   } | |
| } | |
| ... ... | |
| } | |

In some embodiments, rather than conditioning the presence of the flag intra_bdpcm_chroma_flag based on the value of intra_bdpcm_flag, the signaling of the chroma BDPCM mode is conditionally enabled when the intra prediction mode of the luma component is either horizontal or vertical, when the ACT is applied. Specifically, by this method, the flag intra_bdpcm_chroma_flag is only signaled when the luma intra prediction direction is purely horizontal or vertical. Otherwise, the flag intra_bdpcm_chroma_flag is inferred to be 0 (that means the chroma BDPCM is disabled). When the flag intra_bdpcm_chroma_flag is equal to one (i.e., the chroma BDPCM is enabled), the applied BDPCM direction for the chroma components is always set to be equal to the luma intra prediction direction. In the table below, the number 18 and 50 represents the current intra prediction indices of horizontal and vertical intra predictions in the current VVC draft. The corresponding modified syntax table of coding unit is illustrated as follows:

TABLE 11

Conditioning the signaling of the chroma BDPCM enabling/disabling flag when the intra prediction mode of the luma component is either horizontal or vertical

| | Descriptor |
|---|---|
| coding_unit( x0, y0, cbWidth, cbHeight, cqtDepth, treeType, modeType ) { | |
| ... ... | |
| if(sps_act_enabled_flag && CuPredMode[ chType ][ x0 ][ y0 ] == MODE_INTRA && treeType == SINGLE_TREE ) | |
|   cu_act_enabled_flag | ae(v) |
| if( CuPredMode[ chType ][ x0 ][ y0 ] = = MODE_INTRA | | | |
|   CuPredMode[ chType ][ x0 ][ y0 ] = = MODE_PLT ) { | |
|   if( treeType = = SINGLE_TREE | | treeType = = DUAL_TREE_LUMA ) { | |
|     if( pred_mode_plt_flag ) { | |
|       if( treeType = = DUAL_TREE_LUMA ) | |
|         palette_coding( x0, y0, cbWidth, cbHeight, 0, 1) | |
|       else  /* SINGLE_TREE */ | |
|         palette_coding( x0, y0, cbWidth, cbHeight, 0, 3 ) | |
|     } else { | |
|       if( sps_bdpcm_enabled_flag && | |
|       cbWidth <= MaxTsSize && cbHeight <= MaxTsSize ) | |
|         intra_bdpcm_flag | ae(v) |
|       if( intra_bdpcm_flag ) | |
|         intra_bdpcm_dir_flag | ae(v) |
|       else { | |
|         if( sps_mip_enabled_flag && | |
|         ( Abs( Log2( cbWidth ) − Log2( | |
| cbHeight ) ) <= 2 ) && cbWidth <= MaxTbSizeY && cbHeight <= MaxTbSizeY ) | |
|           intra_mip_flag[ x0 ][ y0 ] | ae(v) |
|         if( intra_mip_flag[ x0 ][ y0 ] ) | |
|           intra_mip_mode[ x0 ][ y0 ] | ae(v) |
|         else { | |
|           if( sps_mrl_enabled_flag && ( ( y0 % CtbSizeY ) > 0 ) ) | |
|             intra_luma_ref_idx[ x0 ][ y0 ] | ae(v) |
|           if ( sps_isp_enabled_flag && | |
| intra_luma_ref_idx[ x0 ][ y0 ] = = 0 && | |
|           ( cbWidth <= MaxTbSizeY && cbHeight <= MaxTbSizeY ) && | |
|           ( cbWidth * cbHeight > MinTbSizeY * MinTbSizeY ) && !cu_act_enabled_flag) | |
|             intra_subpartitions_mode_flag[ x0 ][ y0 ] | ae(v) |
|           if( intra_subpartitions_mode_flag[ x0 ][ y0 ] = = 1 ) | |
|             intra_subpartitions_split_flag[ x0 ][ y0 ] | ae(v) |
|           if( intra_luma_ref_idx[ x0 ][ y0 ] = = 0 ) | |
|             intra_luma_mpm_flag[ x0 ][ y0 ] | ae(v) |
|           if( intra_luma_mpm_flag[ x0 ][ y0 ] ) { | |
|             if( intra_luma_ref_idx[ x0 ][ y0 ] = = 0 ) | |
|               intra_luma_not_planar_flag[ x0 ][ y0 ] | ae(v) |
|             if( intra_luma_not_planar_flag[ x0 ][ y0 ] ) | |

TABLE 11-continued

Conditioning the signaling of the chroma BDPCM enabling/disabling flag when the intra prediction mode of the luma component is either horizontal or vertical

| | Descriptor |
|---|---|
|               intra_luma_mpm_idx[ x0 ][ y0 ]<br>    } else<br>              intra_luma_mpm_remainder[ x0 ][ y0 ]<br>    }<br>   }<br>  }<br> }<br>if( ( treeType = = SINGLE_TREE  ||  treeType = = DUAL_TREE_CHROMA ) &&<br>    ChromaArrayType != 0 ) {<br>  if ( pred_mode_plt flag  &&  treeType = = DUAL_TREE_CHROMA )<br>    palette_coding( x0, y0, cbWidth / SubWidthC, cbHeight / SubHeightC, 1, 2 )<br>    else {<br>        if( cbWidth <= MaxTsSize && cbHeight <= MaxTsSize && (!cu_act_enabled_flag || (IntraPredModeY[ x0 ][ y0 ] == 18 ||<br>        IntraPredModeY[ x0 ][ y0 ] == 50)) &&<br>        sps_bdpcm_chroma_enabled_flag ) {<br>        intra_bdpcm_chroma_flag<br>        if( intra_bdpcm_chroma_flag &&<br>        !cu_act_enabled_flag )<br>           intra_bdpcm_chroma_dir_flag<br>    } else {<br>        if( !cu_act_enabled_flag ) {<br>        if( CclmEnabled )<br>        cclm_mode_flag<br>        if( cclm_mode_flag )<br>        cclm_mode_idx<br>        else<br>        intra_chroma_pred_mode<br>        }<br>        }<br>    }<br>  }<br>... ...<br>} | ae(v)<br><br>ae(v)<br><br><br><br><br><br><br><br><br><br><br><br><br><br><br><br><br><br><br>ae(v)<br><br><br><br><br><br><br><br>ae(v)<br><br>ae(v)<br><br>ae(v) |

In some embodiments, context modeling for the luma/chroma BDPCM mode is implemented. In the current BDPCM design in the VVC, the signaling of BDPCM for the luma and chroma components reuses the same context modeling. In details, one single context is shared by the luma BDPCM enabling/disabling flag (i.e., intra_bdpcm_flag) and the chroma BDPCM enabling/disabling flag (i.e., intra_bdpcm_chroma_flag) and another single context is shared by the luma BDPCM direction flag (i.e., intra_bdpcm_dir_flag) and the chroma BDPCM direction flag (i.e., intra_bdpcm_chroma_dir_flag).

In some embodiments, to improve the coding efficiency, in one method, separate contexts are used for signaling the BDPCM enabling/disabling of the luma and chroma components. In another embodiment, separate contexts for signaling the BDPCM direction flag are used for the luma and chroma components. In yet another embodiment, two additional contexts are used to code the chroma BDPCM enabling/disabling flag where the first context is used for signaling the intra_bdpcm_chroma_flag when the luma BDPCM mode is enabled while the second context is used for signaling the intra_bdpcm_chroma_flag when the luma BDPCM mode is disabled.

In some embodiments, the ACT is handled with lossless coding. In HEVC standard, lossless mode of one CU is indicated by signaling one CU-level flag cu_transquant_bypass_flag to be one. However, in the ongoing VVC standardization process, one different lossless enabling method is applied. Specifically, when one CU is coded in lossless mode, it only needs to skip transform and use the quantization step-size to one. This can be achieved by signaling the CU-level QP value to one and signaling the TU-level transform_skip_flag to one. Therefore, in one embodiment of the disclosure, the lossy ACT transform and lossless ACT transform are switched for one CU/TU according to the values of transform_skip_flag and the QP values. When the flag transform_skip_flag is equal to one and the QP value is equal to 4, the lossless ACT transform is applied; otherwise, the lossy version of the ACT transform is applied, as indicated below.

If transform_skip_flag is equal to 1 and QP is equal to 4, the (nTbW)×(nTbH) arrays of residual samples $r_Y$, $r_{Cb}$ and $r_{Cr}$ with x=0 ... nTbW−1, y=0 ... nTbH−1 are modified as follows:

$$tmp = r_Y[x][y] - (r_{Cb}[x][y] >> 1)$$

$$r_Y[x][y] = tmp + r_{Cb}[x][y]$$

$$r_{Cb}[x][y] = tmp - (r_{Cr}[x][y] >> 1)$$

$$r_{Cr}[x][y] = r_{Cb}[x][y] + r_{Cr}[x][y]$$

Otherwise, the (nTbW)×(nTbH) arrays of residual samples $r_Y$, $r_{Cb}$ and $r_{Cr}$ with x=0 ... nTbW−1, y=0 ... nTbH−1 are modified as follows:

$$tmp = r_Y[x][y] - r_{Cb}[x][y]$$

$$r_Y[x][y] = r_Y[x][y] + r_{Cb}[x][y]$$

$$r_{Cb}[x][y] = tmp - r_{Cr}[x][y]$$

$$r_{Cr}[x][y] = tmp + r_{Cr}[x][y]$$

In the above description, different ACT transform matrices are used for lossy and lossless coding. To achieve one more unified design, the lossless ACT transform matrix is used for both lossy and lossless coding. Additionally, given that lossless ACT transform will increase the dynamic range of Cg and Co components by 1 bit, additional 1-bit right shift is applied to Cg and Co components after forward ACT transform while 1-bit left shift is applied to Cg and Co components before inverse ACT transform. As described below, If transform_skip_flag is equal to 0 or QP is not equal to 4, the (nTbW)×(nTbH) arrays of residual samples $r_{Cb}$ and $r_{Cr}$ with x=0 ... nTbW−1, y=0 ... nTbH−1 are modified as follows:

$$r_{Cb}[x][y] = r_{Cb}[x][y] << 1$$

$$r_{Cr}[x][y] = r_{Cr}[x][y] << 1$$

The (nTbW)×(nTbH) arrays of residual samples $r_Y$, $r_{Cb}$ and $r_{Cr}$ with x=0 ... nTbW−1, y=0 ... nTbH−1 are modified as follows:

$$tmp = r_Y[x][y] - (r_{Cb}[x][y] >> 1)$$

$$r_Y[x][y] = tmp + r_{Cb}[x][y]$$

$$r_{Cb}[x][y] = tmp - (r_{Cr}[x][y] >> 1)$$

$$r_{Cr}[x][y] = r_{Cb}[x][y] + r_{Cr}[x][y]$$

Additionally, as can be seen from above, when the ACT is applied, QP offsets (−5, −5, −3) are applied to Y, Cg and Co components. Therefore, for small input QP values (e.g., <5), negative QPs will be used for quantization/dequantization of ACT transform coefficients, which are not defined. To solve such problem, one clipping operation is added after the QP adjustment of the ACT such that the applied QP values are always equal to or larger than zero, i.e., QP'=max($QP_{org}$−$QP_{offset}$, 0), where QP is original QP, $QP_{offset}$ is ACT QP offset and QP' is the adjusted QP value.

In the method as mentioned above, though the same ACT transform matrices (i.e., lossless ACT transform matrices) are used for both lossy and lossless coding, the following two problems can still be identified:

Different inverse ACT operations are still applied depending whether the current CU is lossy or lossless CU. Specifically, for lossless CUs, the inverse ACT transform is applied; for lossy CUs, additional right shifts need to be applied before inverse ACT transform. Additionally, decoder needs to know whether the current CU is coded in lossy mode or lossless mode. This is inconsistent with the current VVC lossless design. In details, unlike the HEVC lossless design where the lossless mode of one CU is indicated by signaling one cu_transquant_bypass_flag, the lossless coding in the VVC is done in one pure non-normative way, i.e., skipping the transform of prediction residuals (enabling transform skip mode for luma and chroma components), selecting an appropriate QP value (i.e., 4) and explicitly disabling the coding tools that prevent lossless coding such as in-loop filters.

The QP offsets that are used to normalize the ACT transforms are now fixed. However, the selection of optimal QP offsets in terms of coding efficiency may be dependent on content itself. Therefore, it may be more beneficial to allow flexible QP offset signaling when the ACT tool is enabled in order to maximize its coding gain.

Based on the above considerations, one unified ACT design is implemented as follows. Firstly, the lossless ACT forward and inverse transforms are applied for the CUs that are coded in both lossy mode and lossless mode. Secondly, rather than using the fixed QP offsets, the QP offsets (i.e., three QP offsets that applied to Y, Cg and Co components) are explicitly signaled that are applied to ACT CUs in bitstream. Thirdly, to prevent the possible overflow issue of the QPs that are applied to ACT CUs, clipping operations are applied to the resulting QPs of each ACT CU to valid QP range. As can be seen, based on the above method, the selection between lossy coding and lossless coding can be realized by purely encoder-only modifications (i.e., using different encoder settings). The decoding operation is the same for both lossy and lossless coding of an ACT CU. Specifically, to enable the lossless coding, in addition to the existing encoder-side lossless configurations, the encoder only needs to signal the values of three QP offsets as zeros. On the other hand, to enable the lossy coding, the encoder may signal non-zero QP offsets. For example, in one embodiment, to compensate the dynamic range change caused by the lossless ACT transform in lossy coding, the QP offsets (−5, 1, 3) may be signaled for Y, Cg and Co components when the ACT is applied. On the other hand, the ACT QP offsets can be signaled at different coding levels, for instance, sequence parameter set (SPS), picture parameter set (PPS), picture header, coding block group level and so forth, which can provide different QP adaptation at different granularities. The following table gives one example where the QP offset signaling is carried out in SPS.

TABLE 12

Syntax specification where the QP offset signaling is carried out in SPS

| | Descriptor |
|---|---|
| sequence_parameter_set { | |
| ... | |
| if(sps_act_enabled_flag){ | |
| sps_act_y_qp_offset_plus5 | se(v) |
| sps_act_cg_qp_offset_minus1 | se(v) |
| sps_act_co_qp_offset_minus3 | se(v) |
| } | |
| ... | |
| } | |

In another embodiment, one high-level control flag is added at SPS or PPS (e.g., picture_header_act_qp_offset_present_flag). When the flag is equal to zero, it means the QP offsets that are signaled in SPS or PPS will be applied to all the CUs that are coded in the ACT mode. Otherwise, when the flag is equal to one, additional QP offset syntax (e.g., picture_header_y_qp_offsetplus5, picture_header_cg_qp_offset_minus1 and picture_header_co_qp_offset_minus3) may be further signaled in picture header to control the applied QP values to the ACT CUs separately in one specific picture.

On the other hand, the signaled QP offsets should be also applied to clip the final ACT QP values to the valid dynamic range. Additionally, different clipping range may be applied to CUs that are coded with transform and without transform. For instance, when transforms are not applied, the final QP should be no smaller than 4. Assuming the ACT QP offsets are signaled in SPS level, the corresponding QP value derivation process for the ACT CUs can be described as below:

$QpY=((qPY\_PRED+CuQpDeltaVal+64+2*QpBdOffset+sps\_act\_y\_qp\_offset) \%(64+QpBdOffset))-QpBdOffset$ $Qp'_{Cb}=Clip3(-QpBdOffset,63,qP_{Cb}+pps\_cb\_qp\_offset+slice\_cb\_qp\_offset+CuQpOff set_{Cb}+sps\_act\_cg\_offset)+QpBdOffset$ $Qp'_{Cr}=Clip3(-QpBdOffset,63,qP_{Cr}+pps\_cr\_qp\_offset+slice\_cr\_qp\_offset+CuQpOffset_{Cr}+sps\_act\_co\_offset)+QpBdOffset$ $Qp'_{CbCr}=Clip3(-QpBdOffset,63,qP_{CbCr}+pps\_joint\_cbcr\_qp\_offset+slice\_joint\_cbcr\_qp\_offset+CuQpOffset_{CbCr}+sps\_act\_cg\_offset)+QpBdOffset$ In another embodiment, the ACT enabling/disabling flag is signaled at the SPS level while signaling the ACT QP offsets in the PPS level to allow more flexibilities for the encoder to adjust the QP offsets that are applied to the ACT CUs in order to improve the coding efficiency. Specifically, the SPS and PPS syntax tables with the described changes are present in the following table.

TABLE 13

Syntax specification where the ACT enabling/disabling
flag is signaled at the SPS level while signaling
the ACT QP offsets in the PPS level

| | Descriptor |
|---|---|
| seq_parameter_set_rbsp( ) { | |
| ... | |
|   if(chroma_format_idc == 3) | |
|     sps_act_enabled_flag | u(1) |
| ... | |
| } | |
| pic_parameter_set_rbsp( ) { | |
|   pps_act_qp_offset_present_flag | u(1) |
|   if( pps_act_qp_offset_present_flag ) { | |
|     pps_act_y_qp_offset_plus5 | se(v) |
|     pps_act_cg_qp_offset_minus1 | se(v) |
|     pps_act_co_qp_offset_minus3 | se(v) |
|   } | |
|   rbsp_trailing_bits( ) | |
| } | | pps_act_qp_offset_present_flag equal to 1 specifies that pps_act_y_qp_offsetplus5, pps_act_cg_qp_offset_minus1 and pps_act_co_qp_offset_minus3 are present in the bitstream. When pps_act_qp_offset_present_flag is equal to 0, the syntax elements pps_act_y_qp_offset_plus5, pps_act_cg_qp_offset_minus1 and pps_act_co_qp_offset_minus3 are not present in the bitstream. It is bitstream conformance that the value of pps_act_qp_offset_present_flag should be 0 when sps_act_enabled_flag is equal to 0.

pps_act_y_qp_offset_plus5, pps_act_cg_qp_offset_minus1 and pps_act_co_qp_offset_minus3 are used to determine the offsets that are applied to the values of quantization parameter used for luma and chroma components of coding block whose cu_act_enabled_flag is equal to 1. When not present, the values of pps_act_y_qp_offset_plus5, pps_act_cg_qp_offset_minus1 and pps_act_cr_qp_offset_minus3 are inferred to be equal to 0.

In the above PPS signaling, the same QP offset values are applied to the ACT CUs when the joint coding of chroma residuals (JCCR) mode is either applied or not. Such design may not be optimal given that only the residuals of one signal chroma components are coded in the JCCR mode. Therefore, to achieve one better coding gain, one different QP offset may be applied to code the residuals of chroma components when the JCCR mode is applied to one ACT CU. Based on such consideration, one separate QP offset signaling is added in the PPS for the JCCR mode, as specified as below.

TABLE 14

Syntax specification where a separate QP offset
signaling is added in the PPS for the JCCR mode

| | Descriptor |
|---|---|
| pic_parameter_set_rbsp( ) { | |
|   pps_act_qp_offset_present_flag | u(1) |
|   if( pps_act_qp_offset_present_flag ) { | |
|     pps_act_y_qp_offset_plus5 | se(v) |
|     pps_act_cg_qp_offset_minus1 | se(v) |
|     pps_act_co_qp_offset_minus3 | se(v) |
|     pps_joint_cbcr_qp_offset | se(v) |
|   } | |
|   rbsp_trailing_bits( ) | |
| } | | pps_joint_cbcr_qp_offset is used to determine the offset that are applied to the values of quantization parameter used for chroma residuals of coding block where joint chroma residual coding is applied. When not present, the value of pps_joint_cbcr_qp_offset is inferred to be equal to zero.

Figure 10:
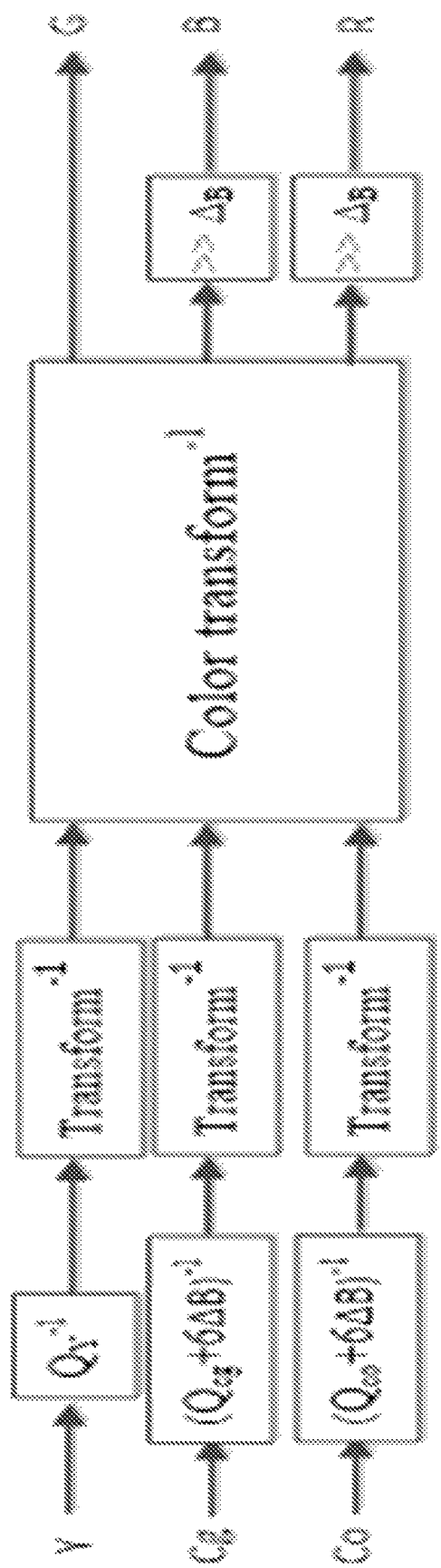
FIG. 10 is a decoding flowchart of applying different quantization parameter (QP) offsets for different components when the luma and chroma internal bit-depths are different in accordance with some implementations of the present disclosure.

In some embodiments, FIG. 10 shows a method of handling the ACT when the internal luma and chroma bit-depths are different. Specifically, FIG. 10 is a decoding flowchart of applying different QP offsets for different components when the luma and chroma internal bit-depths are different in accordance with some implementations of the present disclosure.

According to the existing VVC specification, luma and chroma components are allowed to use different internal bit-depths (denoted as $BitDepth_Y$ and $BitDepth_C$) for coding. However, the existing ACT design always assumes that the internal luma and chroma bit-depths are identical. In this section, methods are implemented to improve the ACT design when $BitDepth_Y$ is not equal to $BitDepth_C$.

In the first method, the ACT tool is always disabled when the internal luma bit-depth is not equal to that of chroma components.

In the second method, it is implemented in the second solution to align the bit depths of the luma component and the chroma components by left shift the component with smaller bit depth to match the bit depth of the other component; then, the scaled component will be readjusted to the original bit depth through right bit shift after color transform.

Similar to HEVC, the quantization step size increase about $2^{1/6}$ times with each increment of QP and exactly doubles for every 6 increments. Based on such design, in the second method, to compensate the internal bit-depth between luma and chroma, it is implemented to increase the QP value that is used to the component with smaller internal bit-depth by 6Δ where Δ is the difference between luma and chroma internal bit-depth. Then, the residuals of the component are then shifted back to the original dynamic range by applying right shifts of Δ bits. FIG. 10 illustrates the corresponding decoding process when the above method is applied. For example, assuming input QP value is qp, then the default QP values that are applied to Y, Cg and Co components are equal to qp−5, qp−5 and qp−3. Further, it is assumed that luma internal bit-depth is higher than chroma bit-depth, i.e., $\Delta = BitDepth_Y - BitDepth_C$. Then, the final QP values that are applied to the luma and chroma components are equal to qp−5, qp−5+6Δ and qp−3+6Δ.

In some embodiments, encoder speed-up logics are implemented. To select the color space for the residual coding of one CU, the most straightforward approach is to let encoder check each coding mode (e.g., intra coding mode, inter coding mode and IBC mode) twice, one with the ACT being enabled and the other with the ACT being disabled. This could approximately double the encoding complexity. To further reduce the encoding complexity of the ACT, the following encoder speed-up logics are implemented in this disclosure:

First, as the YCgCo space is a more compact than the RGB space, when the input video is in the RGB format, it is implemented to firstly check the rate-distortion (R-D) cost of enabling the ACT tool and then check the R-D cost of disabling the ACT tool. In addition, the calculation of R-D cost of disabling the color space transform is only conducted if there is at least one non-zero coefficient when the ACT is enabled. Alternatively, when the input video is in the YCbCr format, it is implemented to check the R-D cost of disabling the ACT followed the R-D check of enabling the ACT. The second R-D check (i.e., enabling the ACT) is only performed when there is at least one non-zero coefficient when the ACT is disabled.

Second, in order to reduce the number of tested coding modes, it is implemented to use the same coding modes for two color spaces. More specifically, for intra mode, the selected intra prediction modes for full R-D cost comparison are shared between two color spaces; for inter mode, the selected motion vector, reference picture, motion vector predictor and merge index (used for inter merge mode) are shared between two color spaces; for IBC mode, the selected block vector and block vector predictor and merge index (used for IBC merge mode) are shared between two color spaces.

Third, because of the quad/binary/ternary-tree partition structure used in the VVC, one same block partition can be obtained through different partition combinations. To speed-up the color space selection, it is implemented to use the ACT enabling/disabling decision when one same block is achieved through different partition path. Specifically, the selected color space for coding the residuals of one specific CU will be stored when the CU is firstly coded. Then, when the same CU is obtained by another partition path, instead of choosing between the two spaces, the stored color space decision will be directly reused.

Fourth, given the strong correlation between one CU and its spatial neighbors, it is implemented to use the color space selection information of its spatial neighboring blocks to decide how many color spaces are needed to be examined for the residual coding of the current CU. For instance, if there are enough number of spatial neighboring block select the YCgCo space to coding their residuals, then it is reasonable to infer that the current CU is likely to choose the same color space. Correspondingly, the R-D check of coding the residuals of the current CU in the original color space can be skipped. If there are enough spatial neighbors selecting the original color space, then the R-D check of the residual coding in YCgCo domain can be bypassed. Otherwise, both two color spaces need to be tested.

Fifth, given that there are strong correlations between CUs in the same region, one CU could select the same color space as its parent CU for coding its residuals. Or the child CU can derive the color space from the information of its parent, such as the selected color space and RD cost of each color space. Therefore, in order to simply encoding complexity, checking the R-D cost of the residual coding in RGB domain will be skipped for one CU if the residual of its parent CU is encoded in YCgCo domain; In addition, checking the RD cost of the residual coding in YCgCo domain will be skipped if the residual of its parent CU is encoded in RGB domain. Another conservative way is to use the R-D costs of its parent CU in two color spaces if two color spaces are tested in its parent CU's encoding. The RGB color space will be skipped if its parent CU selects YCgCo color space and the RD cost of YCgCo is much smaller than that of RGB, and vice versa.

In some embodiments, 4:4:4 video coding efficiency is improved by enabling luma-only coding tools for chroma components. Because the main focus of the VVC design is for videos captured in 4:2:0 chroma format, most of the existing inter/intra coding tools are only enabled for luma component but disabled for chroma components. But as discussed earlier, video signals in 4:4:4 chroma format show quite different characteristics when compared to 4:2:0 video signals. For instance, similar to luma component, Cb/B and Cr/R components of 4:4:4 YCbCr/RGB videos often contains useful high-frequency textures and edge information. This is different from the chroma components in 4:2:0 videos that are usually very smooth and contain much less information than luma component. Based on such analysis, the following methods are implemented to extend some luma-only coding tools in the current VVC to chroma components when the input video is in 4:4:4 chroma format.

First, the luma interpolation filters are enabled for the chroma components. Like the HEVC, the VVC standard utilizes motion compensated prediction technique to exploit the redundancy between temporal neighboring pictures, which supports motion vectors as accurate as one sixteen pixel for Y component and one thirty-two pixel for Cb and Cr components. The fractional samples are interpolated using a set of separable 8-tap filters. The fractional interpolation of Cb and Cr components is essentially the same as that of Y component, except that separable 4-tap filters are used for the case of 4:2:0 video format. This is because for 4:2:0 videos Cb and Cr components contain much less information than Y component and 4-tap interpolation filters could reduce the complexity of fractional interpolation filtering without scarifying the efficiency of motion compensated prediction for Cb and Cr components, when compared to using 8-tap interpolation filters.

As pointed out before, the existing 4-tap chroma interpolation filters may not be efficient for interpolating fractional samples for the motion compensated prediction of chroma components in 4:4:4 videos. Therefore, in one embodiment of the disclosure, it is implemented to use the same set of 8-tap interpolation filters (that are used for luma component in 4:2:0 videos) for the fractional sample interpolations of both luma and chroma components in 4:4:4 videos. In another embodiment, for a better tradeoff between coding efficiency and complexity, it is implemented to enable adaptive interpolation filter selection for chroma samples in 4:4:4 videos. For instance, one interpolation filter selection flag may be signaled in SPS, PPS and/or slice level to indicate whether the 8-tap interpolation filters (or other interpolation filters) or the default 4-tap interpolation filters are used for the chroma components at various coding levels.

Second, the PDPC and MRL are enabled for the chroma components.

The position-dependent intra prediction combination (PDPC) tool in the VVC extends the above idea by employing weighted combination of intra prediction samples with unfiltered reference samples. In the current VVC working draft, the PDPC is enabled for the following intra modes without signaling: planar, DC, horizontal (i.e., mode 18), vertical (i.e., mode 50), angular directions close to the bottom-left diagonal directions (i.e., mode 2, 3, 4, . . . , 10) and angular directions close to the top-right diagonal directions (i.e., mode 58, 59, 60, . . . , 66). Assuming the prediction sample located as coordinate (x, y) is pred(x,y), its corresponding value after the PDPC is calculated as $$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where $R_{x,-1}$, $R_{-1,y}$ represent the reference samples located at the top and left of current sample (x, y), respectively, and $R_{-1,-1}$ represents the reference sample located at the top-left corner of the current block. The weights wL, wT and wTL in the above equation are adaptively selected depending on prediction mode and sample position, as described as follows where the current coding block is assumed to be in the size of W×H:

For the DC mode, $$wT=32>>((y<<1)>>\text{shift}), wL=32>>((x<<1)>>\text{shift}),$$
$$wTL=(wL>>4)+(wT>>4)$$

For the planar mode, $$wT=32>>((y<<1)>>\text{shift}), wL=32>>((x<<1)>>\text{shift}),$$
$$wTL=0$$

For horizontal mode:

$$wT=32>>((y<<1)>>\text{shift}), wL=32>>((x<<1)>>\text{shift}),$$
$$wTL=wT$$

For vertical mode:

$$wT=32>>((y<<1)>>\text{shift}), wL=32>>((x<<1)>>\text{shift}),$$
$$wTL=wL$$

For bottom-left diagonal directions:

$$wT=16>>((y<<1)>>\text{shift}), wL=16>>((x<<1)>>\text{shift}),$$
$$wTL=0$$

For top-right diagonal directions:

$$wT=16>>((y<<1)>>\text{shift}), wL=16>>((x<<1)>>\text{shift}),$$
$$wTL=0 \text{ where shift}=(\log 2(W)-2+\log 2(H)-2+2)>>2.$$

Unlike the HEVC where only the nearest row/column of reconstructed samples as reference, multi-reference line (MRL) is introduced in the VVC where two additional rows/columns are used for the intra prediction. The index of the selected reference row/column is signaled from encoder to decoder. When non-nearest row/column is selected, planar and DC modes are excluded from the set of intra modes that can be used to predict the current block.

In the current VVC design, the PDPC tool is only employed by the luma component to reduce/remove the discontinuity between the intra prediction samples and its reference samples derived from reconstructed neighboring samples. However, as mentioned earlier, there may be abundant texture information in the chroma blocks in video signals in 4:4:4 chroma format. Therefore, a tool like PDPC that uses the weighted average of unfiltered reference samples and intra prediction samples to improve the prediction quality should be also beneficial for improving the chroma coding efficiency of 4:4:4 videos. Based on such consideration, in one embodiment of the disclosure it is implemented to enable the PDPC process for the intra prediction of chroma components in 4:4:4 videos.

The same consideration can be also extended to the MRL tool. In the current VVC, the MRL cannot be applied to the chroma components. Based on an embodiment of the disclosure, it is implemented to enable the MRL for the chroma components for 4:4:4 videos by signaling one MRL index for the chroma components of one intra CU. Different methods may be used based on this embodiment. In one method, one additional MRL index may be signaled and shared by both Cb/B and Cr/R components. In another method, it is implemented to signal two MRL indices, one for each chroma component. In the third method, it is implemented to reuse the luma MRL index for the intra prediction of chroma components such that no additional MRL signaling is needed to enable the MRL for the chroma components.

Third, the ISP is enabled for the chroma components.

In some embodiments, one coding tool called sub-partition prediction (ISP) is introduced into VVC to further improve intra coding efficiency. Conventional intra mode only utilizes the reconstructed samples neighboring to one CU to generate the intra prediction samples of the block. Based on such design, the spatial correlation between the predicted samples and the reference samples is roughly proportional to the distance between them. Therefore, the samples at the inner part (especially the samples located at the bottom-right corner of the block) usually have a worse prediction quality than the samples that are close to the block boundaries. Depending on the block size, the ISP divides the current CU into 2 or 4 subblocks in either horizontal or vertical direction and each sub-block contains at least 16 samples. The reconstructed samples in one subblock can be used as references to predict the samples in the next subblock. The above process is repeated until all the subblocks within the current CU are coded. In addition, to reduce the signaling overhead, all the subblocks inside one ISP CU shares the same intra mode. Additionally, according to the existing ISP design, the subblock partition is only applicable to the luma component. Specifically, only the luma samples of one ISP CU can be further split into multiple subblocks (or TUs) and each luma subblocks are separately coded. However, the chroma samples of the ISP CU are not divided. In other words, for chroma components, the CU is used as the processing unit for intra prediction, transform, quantization and entropy coding without further partitioning.

In the current VVC, when the ISP mode is enabled, the TU partition is only applied to luma samples while the chroma samples are coded without further splitting into multiple TUs. According to an embodiment of the disclosure, due to abundant texture information in chroma planes, it is implemented to also enable the ISP mode for chroma coding in 4:4:4 videos. Different methods may be used based on this embodiment. In one method, one additional ISP index is signaled and shared by two chroma components. In another method, it is implemented to separately signal two additional ISP indices, one for Cb/B and the other for Cr/R. In the third method, it is implemented to reuse the ISP index that is used for luma components for the ISP prediction of the two chroma components.

Fourth, the Matrix based intra prediction (MIP) is enabled for the chroma components as a new intra prediction technique.

For predicting the samples of a rectangular block of width W and height H, MIP takes one line of H reconstructed neighboring boundary samples left of the block and one line of W reconstructed neighbouring boundary samples above the block as input. If the reconstructed samples are unavailable, they are generated as it is done in the conventional intra prediction.

In some embodiments, the MIP mode is only enabled for the luma components. Due to the same reasons of enabling ISP mode for chroma components, in one embodiment, it is implemented to enable the MIP for chroma components for 444 videos. Two signaling methods may be applied. In the first method, it is implemented to separately signal two MIP modes, one used for luma component and the other used for two chroma components. In the second method, it is implemented to only signal one single MIP mode shared by luma and chroma components.

Fifth, the Multiple Transform Selection (MTS) is enabled for the chroma components.

In addition to DCT-II that has been employed in HEVC, a MTS scheme is used for residual coding both inter and intra coded blocks. It uses multiple selected transforms from the DCT8/DST7. The newly introduced transform matrices are DST-VII and DCT-VIII.

In the current VVC, the MTS tool is only enabled for the luma components. In one embodiment of the disclosure, it is implemented to enable the MIP for the chroma components for 444 videos. Two signaling methods may be applied. In the first method, it is implemented to separately signal two transform indices when the MTS is enabled for one CU, one used for luma component and the other used for two chroma components. In the second method, it is implemented to signal one transform index when the MTS is enabled which is shared by luma and chroma components.

In some embodiments, unlike the HEVC standard where a fixed look-up table is used to derive the quantization parameter (QP) used from the chroma components based on luma QP, a luma-to-chroma mapping table is transmitted from the encoder to the decoder in VVC standard, which is defined by several pivot points of a piecewise linear function. Specifically, the syntax elements and reconstruction process of a luma-to-chroma mapping table are described as below:

TABLE 15

| The syntax elements and reconstruction process of a luma-to-chroma mapping table | Descriptor |
|---|---|
| seq_parameter_set_rbsp( ) { | |
| ... ... | |
|   if( ChromaArrayType != 0 ) { | |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
| ... ... | |
| } | | same_qp_table_for_chroma equal to 1 specifies that only one chroma QP mapping table is signaled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signaled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of numpoints_in_qp_table_minus1[i] shall be in the range of 0 to 63+QpBdOffset, inclusively. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1 [0][j] is inferred to be equal to 0.

delta_qp_diff_val[i] [j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = −qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
    ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63,
ChromaQpTable[ i ][ k + 1 ] − 1 )
for( j = 0; j <+ num_points_in_qp_table_minus1[ i ]; j++ ) {
    sh = ( delta_qp_in_val_minus1[ i ][j] + 1 ) >> 1
    for( k = qpInVal[ i ][ j ] + 1, m = 1; k <= qpInval[ i ][ j + 1 ]; k++,
        m++ )
        ChromaQpTable[ i ][ k ] = ChromaQpTable[ i ][ qpInVal[ i ][ j ] ] +
            ( ( qpOutVal[ i ][j + 1] − qpOutVal[ i ][j] ) * m + sh ) /
( delta_qp_in_val_minus1[ i ][j] + 1 )
}
for( k = qpInVal[ i ][ num_points_in_qp_table_minus1[ i ] + 1 ] + 1;
k <= 63; k++ )
    ChromaQpTable[ i ][ k ] = Clip3( −QpBdOffset, 63,
ChromaQpTable[ i ][ k − 1 ] + 1 )
```

In some embodiments, an improved luma-to-chroma mapping function for RGB videos is disclosed herein.

In some embodiments, when the input video is in RGB format, one two-piece linear function is transmitted from encoder to decoder for mapping luma QPs to chroma QPs. This is done by setting the syntax element same_qp_table_for_chroma=1, qp_table_start_minus26[0]=0, num_points_in_qp_table_minus1[0]=0, delta_qp_in_val_minus1 [0][0]=0 and delta_qp_diff_val[0][0]=0. Specifically, the corresponding luma-to-chroma QP mapping function is defined as $$QP_c = \begin{cases} QP_L, & -BDOffset \leq QP_L \leq 26 \\ QP_L - 1, & QP_L > 26 \end{cases} \quad (5)$$

Assuming the internal coding bit-depth is 10-bit, Table 16 illustrates the luma-to-chroma QP mapping function that is applied for RGB coding.

TABLE 16

| The luma-to-chroma QP mapping table used for RGB coding | | | | | | | | | | | | | | |
|---|---|---|---|---|---|---|---|---|---|---|---|---|---|---|
| Luma QP | −12 | −11 | −10 | ... | 25 | 26 | 27 | 28 | 29 | ... | 60 | 61 | 62 | 63 |
| Chroma QP | −12 | −11 | −10 | ... | 25 | 26 | 26 | 27 | 28 | ... | 59 | 60 | 61 | 62 |

As shown in (5), when the luma QP is large than 26, unequal QP values are used for coding the luma and the chroma components. In some embodiments, the unequal QP values have impacts on not only the quantization/de-quantization process but also the decisions that are made during a rate-distortion (R-D) optimization, given that the weighted chroma distortion is used when calculating the R-D cost for mode decision, as specified by the following equation.

$$J_{mode}=(SSE_{luma}+w_{chroma}\cdot SSE_{chroma})+\lambda_{mode}\cdot R_{mode} \quad (6)$$

where $SSE_{luma}$ and $SSE_{chroma}$ are the distortion of luma and chroma components, respectively; $R_{mode}$ is the number of bits; $\lambda_{mode}$ is Lagrange multiplier; $w_{chroma}$ is weighting parameter for chroma distortion which is calculated as $$w_{chroma}=2^{(QPL-QPC)/3} \quad (7)$$

However, compared to YCbCr/YUV videos, there are stronger correlation among the three channels of RGB videos. Therefore, strong textures and high-frequency information are usually present in all three components when video content are captured in RGB format, i.e., the information in R, G and B are equally important. Therefore, in one embodiment of the disclosure, equal QP values are applied to all three channels for RGB coding. This can be done by setting the corresponding luma-to-chroma QP mapping syntax elements as same_qp_table_for_chroma=1, qp_table_start_minus26[0]=0, num_points_in_qp_table_minus1[0]=0, delta_qp_in_val_minus1[0][0]=0 and delta_qp_diff_val[0] [0]=1. Correspondingly, with the method disclosed herein, the RGB luma-to-chroma mapping function is illustrated by equation (8) and Table 17.

TABLE 17

The luma-to-chroma QP mapping table used for RGB coding

| Luma QP | -12 | -11 | -10 | ... | 25 | 26 | 27 | 28 | 29 | ... | 60 | 61 | 62 | 63 |
|---|---|---|---|---|---|---|---|---|---|---|---|---|---|---|
| Chroma QP | -12 | -11 | -10 | ... | 25 | 26 | 27 | 28 | 29 | ... | 60 | 61 | 62 | 63 |

Figure 11A:
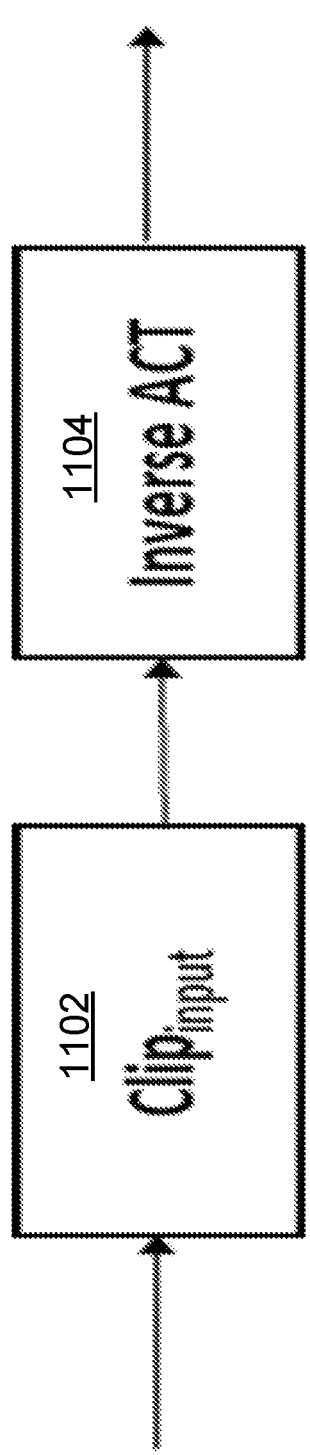
FIGS. 11A and 11B are block diagrams illustrating exemplary video decoding processes by which a video decoder implements the technique of clipping to confine a dynamic range of the residuals of the coding unit within a predefined range for processing by the inverse ACT in accordance with some implementations of the present disclosure.
Figure 11B:
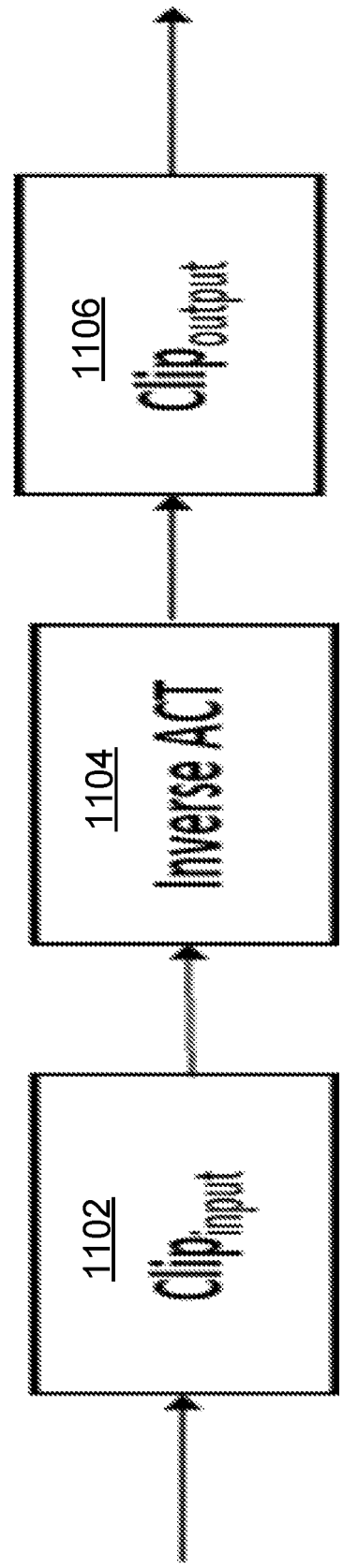

FIGS. 11A and 11B are block diagrams illustrating exemplary video decoding processes by which a video decoder implements the technique of clipping to confine a dynamic range of the residuals of the coding unit within a predefined range for processing by the inverse ACT in accordance with some implementations of the present disclosure.

More specifically, FIG. 11A shows examples where the clipping operation 1102 is applied to the input of the inverse ACT 1104. FIG. 11B shows examples where the clipping operations 1102 and 1106 are applied to both the input and the output of the inverse ACT 1104. In some embodiments, the clipping operations 1102 and 1106 are the same. In some embodiments, the clipping operations 1102 and 1106 are different.

In some embodiments, a bit-depth control method is implemented with the ACT. According to the existing ACT design, the input to the inverse ACT process at decoder is the output residuals from other residual decoding processes, e.g., inverse transform, inverse BDPCM and inverse JCCR. In the current implementation, those residual samples could reach the maximum of 16-bit sign integers. By such design, the inverse ACT cannot be implemented by the 16-bit implementation, which is very costly for hardware implementation. To solve such issue, one clipping operation is applied to the input residuals of the inverse ACT process. In one embodiment, the following clipping operation is applied to the input residuals of the inverse ACT process:

$$Clip_{input}=(-(2^{Bitdepth}-1), 2^{Bitdepth}-1, M)$$

where Bitdepth is the internal coding bit-depth.

In another embodiment, another clipping operation is applied to the input residuals of the inverse ACT process as shown below:

$$Clip_{input}=Clip(-(2^{15}-1), 2^{15}-1, M)$$

Additionally, in another embodiment, a clipping operation is applied to the output residuals of inverse ACT. In one embodiment, the following clipping operation is applied to the output of the inverse ACT:

$$Clip_{output}=Clip(-(2^{Bitdepth}-1), 2^{Bitdepth}-1, M)$$

In another embodiment, the following clipping operation is applied to the output of the inverse ACT:

$$Clip_{output}=Clip(-(2^{15}-1), 2^{15}-1, M)$$

As shown in the lifting operations depicted in FIG. 5B, when the reversible YCgCo transform is applied, due to the lifting operation, the dynamic range of the Cg and Co components will be increased by 1 bit. Therefore, in order to keep the precision of the residual samples output from the reversible YCgCo transform, in one embodiment, the input residuals of the inverse ACT is clipped based on the following equation:

$$Clip_{input}=Clip(-2^{Bitdepth+1}, 2^{Bitdepth+1}-1, M)$$

In another embodiment, different clipping operations are applied to the input Y, Cg and Co residuals to the inverse ACT. Specifically, because the bit-depth of the Y component keeps unchanged before and after the reversible ACT transform, the input luma residuals to the inverse ACT are clipped by the following operation:

$$Clip_{input}=Clip(-2^{Bitdepth}, 2^{Bitdepth}-1, M)$$

For the Cg and Co components, due to the increased bit-depth, the corresponding input residuals to the inverse ACT are clipped by the following operation:

$$Clip_{input}=Clip(-2^{Bitdepth+1}, 2^{Bitdepth+1}-1, M)$$

In another embodiment, the input residuals to the inverse ACT is clipped by the following operation:

$$Clip_{input}=Clip(-2^{C}, 2^{C}-1, M)$$

where C is one fixed number.

Figure 12:
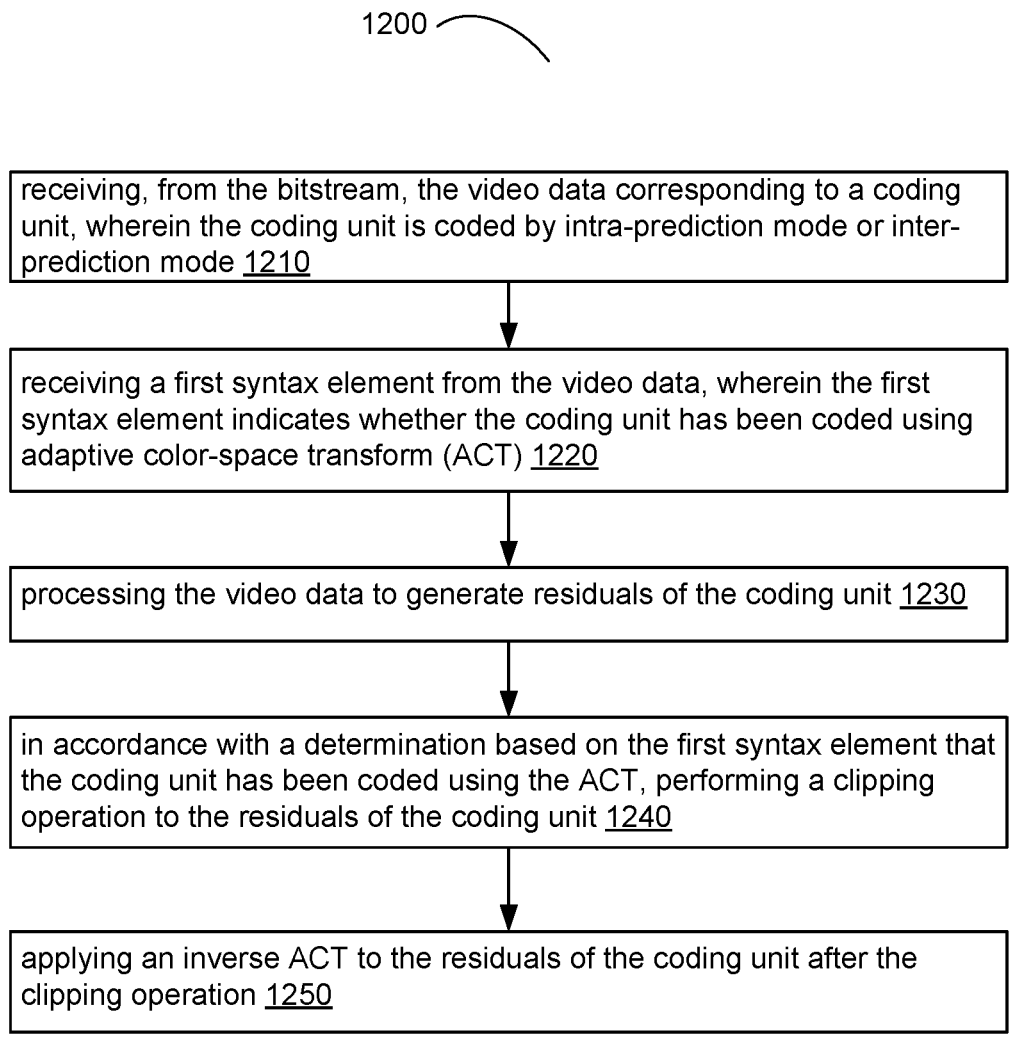
FIG. 12 is a flowchart illustrating an exemplary process by which a video decoder decodes video data by performing a clipping operation to confine a dynamic range of the residuals of the coding unit within a predefined range for processing by the inverse ACT in accordance with some implementations of the present disclosure.

FIG. 12 is a flowchart 1200 illustrating an exemplary process by which a video decoder (e.g., video decoder 30) decodes video data by performing a clipping operation to confine a dynamic range of the residuals of the coding unit within a predefined range for processing by the inverse ACT in accordance with some implementations of the present disclosure.

The video decoder 30 receives, from the bitstream, the video data corresponding to a coding unit, wherein the coding unit is coded by the intra-prediction mode or the inter-prediction mode (1210).

The video decoder 30 then receives a first syntax element from the video data. The first syntax element indicates whether the coding unit has been coded using the adaptive color-space transform (ACT) (1220).

The video decoder 30 then processes the video data to generate the residuals of the coding unit (1230). In accordance with a determination based on the first syntax element that the coding unit has been coded using the ACT, the video decoder 30 performs a clipping operation to the residuals of the coding unit (1240). The video decoder 30 applies an inverse ACT to the residuals of the coding unit after the clipping operation (1250).

In some embodiments, the clipping operation confines a dynamic range of the residuals of the coding unit within a predefined range for processing by the inverse ACT.

In some embodiments, the clipping operation is defined as $$\text{Clip}_{input} = \text{Clip}(-2^{Bitdepth+1}, 2^{Bitdepth+1}-1, M)$$

wherein M is an input to the clipping operation, Bitdepth is an internal coding bit-depth, $\text{Clip}_{input}$ is an output of the clipping operation that is within a range from $-2^{Bitdepth+1}$ to $(2^{Bitdepth+1}-1)$. In some embodiments, if the input M is less than $-2^{Bitdepth+1}$, the output of the clipping operation is set to $-2^{Bitdepth+1}$. In some embodiments, if the input M is greater than $(2^{Bitdepth+1}-1)$, the output of the clipping operation is set to $(2^{Bitdepth+1}-1)$.

In some embodiments, the clipping operation is defined as $$\text{Clip}_{input} = \text{Clip}(-2^{Bitdepth}, 2^{Bitdepth}-1, M)$$

wherein M is an input to the clipping operation, Bitdepth is an internal coding bit-depth, $\text{Clip}_{input}$ is an output of the clipping operation that is within a range from $-2^{Bitdepth}$ to $(2^{Bitdepth}-1)$. In some embodiments, if the input M is less than $-2^{Bitdepth}$, the output of the clipping operation is set to $-2^{Bitdepth}$. In some embodiments, if the input M is greater than $(2^{Bitdepth}-1)$, the output of the clipping operation is set to $(2^{Bitdepth}-1)$.

In some embodiments, before performing the clipping operation, the video decoder 30 applies an inverse transform to the residuals of the coding unit.

In some embodiments, after applying the inverse ACT to the residuals of the coding unit, the video decoder 30 applies a second clipping operation to the residuals of the coding unit.

In some embodiments, the clipping operation adjusts a dynamic range of the residuals of the coding unit within a fixed internal coding bit-depth range implemented by the inverse ACT.

In some embodiments, the fixed internal coding bit-depth is 15.

In some embodiments, after receiving a first syntax element from the video data, the video decoder 30 receives a second syntax element from the video data, wherein the second syntax element indicates a variable internal coding bit-depth used in the clipping operation.

In some embodiments after receiving a first syntax element from the video data, the video decoder 30 receives a second syntax element from the video data, wherein the second syntax element indicates a first internal coding bit-depth, and a second internal coding bit-depth used in the clipping operation is the first internal coding bit-depth plus 1.

In some embodiments, the clipping operation further comprises a first clipping operation applied to a luma component of the residuals of the coding unit, and a second clipping operation applied to chroma components of the residuals of the coding unit.

In some embodiments, the first clipping operation confines a dynamic range of the luma component of the residuals of the coding unit to be within a range of a first internal coding bit-depth plus 1, and the second clipping operation confines the dynamic range of the chroma components of the residuals of the coding unit within a range of a second internal coding bit-depth plus 1 and the second internal coding bit-depth is the first internal coding bit-depth plus 1.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other

What is claimed is:

1. A method of decoding video data, comprising:
receiving, from a bitstream, video data corresponding to a coding unit, wherein the coding unit is coded by intra-prediction mode or inter-prediction mode;
receiving a first syntax element from the video data, wherein the first syntax element indicates that the coding unit has been coded using adaptive color-space transform (ACT);
in accordance with a determination based on the first syntax element that the coding unit has been coded using the ACT:
performing a clipping operation to residuals of the coding unit; and
applying an inverse ACT to the residuals of the coding unit after the clipping operation,
wherein the clipping operation further comprises a first clipping operation applied to a luma component of the residuals of the coding unit, and a second clipping operation applied to chroma components of the residuals of the coding unit.

2. The method according to claim 1, wherein the clipping operation confines a dynamic range of the residuals of the coding unit within a predefined range for processing by the inverse ACT.

3. The method according to claim 1, wherein the clipping operation is defined as $$Clip_{input}=Clip(-2^{Bitdepth+1}, 2^{Bitdepth+1}-1, M)$$

wherein M is an input to the clipping operation, Bitdepth is an internal coding bit-depth, $Clip_{input}$ is an output of the clipping operation that is within a range from $-2^{Bitdepth+1}$ to $(2^{Bitdepth+1}-1)$.

4. The method according to claim 1, further comprising: before performing the clipping operation, applying an inverse transform to generate the residuals of the coding unit.

5. The method according to claim 1, further comprising: after applying the inverse ACT to the residuals of the coding unit, applying a third clipping operation to the residuals of the coding unit.

6. The method according to claim 1, wherein the clipping operation adjusts a dynamic range of the residuals of the coding unit within a fixed internal coding bit-depth range, which is determined based on a fixed internal coding bit-depth for processing by the inverse ACT.

7. The method according to claim 6, wherein the fixed internal coding bit-depth is 15.

8. The method according to claim 1, further comprising: after receiving a first syntax element from the video data, receiving a second syntax element from the video data, wherein the second syntax element indicates a variable internal coding bit-depth used in the clipping operation.

9. The method according to claim 1, further comprising: after receiving a first syntax element from the video data, receiving a second syntax element from the video data, wherein the second syntax element indicates a first internal coding bit-depth, and a second internal coding bit-depth used in the clipping operation is the first internal coding bit-depth plus 1.

10. The method according to claim 1, wherein the first clipping operation confines a dynamic range of the luma component of the residuals of the coding unit to be within a range of a first internal coding bit-depth plus 1, and the second clipping operation confines the dynamic range of the chroma components of the residuals of the coding unit within a range of a second internal coding bit-depth plus 1 and the second internal coding bit-depth is the first internal coding bit-depth plus 1.

11. An electronic apparatus comprising:
one or more processing units;
memory coupled to the one or more processing units; and
a plurality of programs stored in the memory that, when executed by the one or more processing units, cause the electronic apparatus to perform a method of decoding video data, comprising:
receiving, from a bitstream, video data corresponding to a coding unit, wherein the coding unit is coded by intra-prediction mode or inter-prediction mode;
receiving a first syntax element from the video data, wherein the first syntax element indicates that the coding unit has been coded using adaptive color-space transform (ACT);
in accordance with a determination based on the first syntax element that the coding unit has been coded using the ACT:
performing a clipping operation to residuals of the coding unit; and
applying an inverse ACT to the residuals of the coding unit after the clipping operation,
wherein the clipping operation further comprises a first clipping operation applied to a luma component of the residuals of the coding unit, and a second clipping operation applied to chroma components of the residuals of the coding unit.

12. The electronic apparatus according to claim 11, wherein the clipping operation confines a dynamic range of the residuals of the coding unit within a predefined range for processing by the inverse ACT.

13. The electronic apparatus according to claim 11, wherein the clipping operation is defined as $$Clip_{input}=Clip(-2^{Bitdepth+1}, 2^{Bitdepth+1}-1, M)$$

wherein M is an input to the clipping operation, Bitdepth is an internal coding bit-depth, $Clip_{input}$ is an output of the clipping operation that is within a range from $-2^{Bitdepth+1}$ to $(2^{Bitdepth+1}-1)$.

14. The electronic apparatus according to claim 11, wherein the method further comprises: before performing the clipping operation, applying an inverse transform to generate the residuals of the coding unit.

15. The electronic apparatus according to claim 11, wherein the method further comprises: after applying the inverse ACT to the residuals of the coding unit, applying a third clipping operation to the residuals of the coding unit.

16. The electronic apparatus according to claim 11, wherein the clipping operation adjusts a dynamic range of the residuals of the coding unit within a fixed internal coding bit-depth range, which is determined based on a fixed internal coding bit-depth for processing by the inverse ACT.

17. The electronic apparatus according to claim 16, wherein the fixed internal coding bit-depth is 15.

18. The electronic apparatus according to claim 11, wherein the method further comprises: after receiving a first syntax element from the video data, receiving a second syntax element from the video data, wherein the second syntax element indicates a variable internal coding bit-depth used in the clipping operation.

19. A non-transitory computer readable storage medium storing a plurality of programs for execution by an electronic apparatus having one or more processing units, wherein the plurality of programs, when executed by the one or more processing units, cause the electronic apparatus to perform a method of decoding video data, comprising:
receiving, from a bitstream, video data corresponding to a coding unit, wherein the coding unit is coded by intra-prediction mode or inter-prediction mode;
receiving a first syntax element from the video data, wherein the first syntax element indicates that the coding unit has been coded using adaptive color-space transform (ACT);
in accordance with a determination based on the first syntax element that the coding unit has been coded using the ACT:
performing a clipping operation to residuals of the coding unit; and
applying an inverse ACT to the residuals of the coding unit after the clipping operation,
wherein the clipping operation further comprises a first clipping operation applied to a luma component of the residuals of the coding unit, and a second clipping operation applied to chroma components of the residuals of the coding unit.

\* \* \* \* \*